(12) United States Patent
Dimberg et al.

(10) Patent No.: US 12,462,993 B2
(45) Date of Patent: Nov. 4, 2025

(54) CONTROL DEVICE BASE THAT ATTACHES TO THE PADDLE ACTUATOR OF A MECHANICAL SWITCH

(71) Applicant: Lutron Technology Company LLC, Coopersburg, PA (US)

(72) Inventors: Chris Dimberg, Easton, PA (US); Matthew Philip McDonald, Phoenixville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 555 days.

(21) Appl. No.: 17/874,719

(22) Filed: Jul. 27, 2022

(65) Prior Publication Data
US 2022/0359136 A1 Nov. 10, 2022

Related U.S. Application Data

(63) Continuation of application No. 17/141,881, filed on Jan. 5, 2021, now Pat. No. 11,437,209, which is a
(Continued)

(51) Int. Cl.
*H01H 23/04* (2006.01)
*H01H 3/02* (2006.01)
(Continued)

(52) U.S. Cl.
CPC .............. *H01H 23/04* (2013.01); *H01H 3/02* (2013.01); *H01H 9/02* (2013.01); *H02G 3/14* (2013.01);
(Continued)

(58) Field of Classification Search
CPC ............. G05G 1/02; H01H 2003/0293; H01H 2221/082; H01H 2239/006;
(Continued)

(56) References Cited

U.S. PATENT DOCUMENTS 5,264,761 A 11/1993 Johnson et al.
6,005,308 A 12/1999 Bryde et al.
(Continued)

FOREIGN PATENT DOCUMENTS

CN 2596671 Y 12/2003
CN 1853248 A 10/2006
(Continued)

*Primary Examiner* — Nader Bolourchi
(74) *Attorney, Agent, or Firm* — Flaster Greenberg PC

(57) ABSTRACT

A remote control device may control electrical loads and/or load control devices of a load control system without accessing electrical wiring. The remote control device may include a control unit and a base for the control unit. The base may include a frame and a mounting tab that attaches to the paddle actuator of a mechanical switch. The mounting tab may be monolithic with the frame. Alternatively, the base may include a resilient attachment member that extends from the frame and is captively retained by the mounting tab. The frame and the attachment member may be configured such that the attachment member is held in a fixed in position by the frame, or such that the attachment member is translatable relative to the frame. The base may include one or more alignment members. The base may cause a rear surface of the frame to be biased against the mechanical switch.

14 Claims, 28 Drawing Sheets

Related U.S. Application Data continuation of application No. 16/583,784, filed on Sep. 26, 2019, now Pat. No. 10,916,385, which is a continuation of application No. 16/018,957, filed on Jun. 26, 2018, now Pat. No. 10,475,596.

(60) Provisional application No. 62/526,323, filed on Jun. 28, 2017.

(51) Int. Cl.
| | |
|---|---|
| *H01H 9/02* | (2006.01) |
| *H02G 3/14* | (2006.01) |
| *G05G 1/02* | (2006.01) |
| *H01H 23/14* | (2006.01) |
| *H05B 47/19* | (2020.01) |

(52) U.S. Cl.
CPC ....... *G05G 1/02* (2013.01); *H01H 2003/0293* (2013.01); *H01H 23/145* (2013.01); *H01H 2221/082* (2013.01); *H01H 2239/006* (2013.01); *H01H 2239/074* (2013.01); *H05B 47/19* (2020.01)

(58) Field of Classification Search
CPC ............. H01H 2239/074; H01H 23/04; H01H 23/145; H01H 3/02; H01H 9/02; H02G 3/14; H05B 47/19; H05B 47/1975
See application file for complete search history.

(56) References Cited

U.S. PATENT DOCUMENTS

| | | | |
|---|---|---|---|
| 6,979,790 B2 | 12/2005 | Kurek et al. | |
| 7,834,856 B2 | 11/2010 | Grinshpoon et al. | |
| 8,167,457 B1 | 5/2012 | Forster et al. | |
| 9,208,965 B2 | 12/2015 | Busby et al. | |
| D761,277 S | 7/2016 | Harvell | |
| 9,418,802 B2 | 8/2016 | Romano et al. | |
| 9,520,247 B1 | 12/2016 | Finnegan et al. | |
| 9,583,288 B2 | 2/2017 | Jones et al. | |
| 9,746,138 B1 | 8/2017 | Thomas et al. | |
| 9,799,469 B2 | 10/2017 | Bailey et al. | |
| 9,959,997 B2 | 5/2018 | Bailey et al. | |
| 2003/0019733 A1 | 1/2003 | Sato | |
| 2003/0019734 A1 | 1/2003 | Sato et al. | |
| 2003/0230982 A1 | 12/2003 | Pagano et al. | |
| 2004/0231968 A1 | 11/2004 | Yu et al. | |
| 2005/0016825 A1 | 1/2005 | Kurek et al. | |
| 2008/0315798 A1 | 12/2008 | Diederiks et al. | |
| 2009/0256483 A1 | 10/2009 | Gehman et al. | |
| 2010/0084996 A1 | 4/2010 | Van De Sluis et al. | |
| 2010/0127626 A1 | 5/2010 | Altonen et al. | |
| 2010/0244706 A1 | 9/2010 | Steiner et al. | |
| 2010/0244709 A1 | 9/2010 | Steiner et al. | |
| 2010/0314226 A1 | 12/2010 | Patel et al. | |
| 2011/0259722 A1* | 10/2011 | Alderson | H02G 3/14 200/339 |
| 2012/0292174 A1 | 11/2012 | Mah et al. | |
| 2013/0099011 A1 | 4/2013 | Matsuoka et al. | |
| 2013/0099124 A1 | 4/2013 | Filson et al. | |
| 2013/0338839 A1 | 12/2013 | Rogers et al. | |
| 2014/0117859 A1 | 5/2014 | Swatsky et al. | |
| 2014/0145646 A1 | 5/2014 | Zhang et al. | |
| 2014/0152186 A1 | 6/2014 | Zhang | |
| 2014/0266669 A1 | 9/2014 | Fadell et al. | |
| 2015/0077021 A1 | 3/2015 | McCarthy et al. | |
| 2015/0294816 A1 | 10/2015 | Evers et al. | |
| 2015/0371534 A1 | 12/2015 | Dimberg et al. | |
| 2016/0007431 A1 | 1/2016 | Bosua et al. | |
| 2016/0049267 A1 | 2/2016 | Bailey et al. | |
| 2016/0073479 A1 | 3/2016 | Erchak et al. | |
| 2017/0077021 A1 | 3/2017 | Sullivan et al. | |
| 2017/0103859 A1 | 4/2017 | Swatsky et al. | |
| 2017/0105176 A1 | 4/2017 | Finnegan et al. | |
| 2017/0226799 A1 | 8/2017 | Hebeisen et al. | |
| 2017/0354023 A1 | 12/2017 | Dimberg et al. | |
| 2018/0190451 A1 | 7/2018 | Scruggs | |

FOREIGN PATENT DOCUMENTS

| | | |
|---|---|---|
| CN | 101347050 A | 1/2009 |
| CN | 201599843 U | 10/2010 |
| CN | 101923321 A | 12/2010 |
| CN | 201766303 U | 3/2011 |
| CN | 102293060 A | 12/2011 |
| CN | 203491998 U | 3/2014 |
| CN | 203521217 U | 4/2014 |
| CN | 106229172 A | 12/2016 |
| JP | 2003157745 A | 5/2003 |
| JP | 2009223334 A | 10/2009 |
| WO | 2014066269 A1 | 5/2014 |

\* cited by examiner

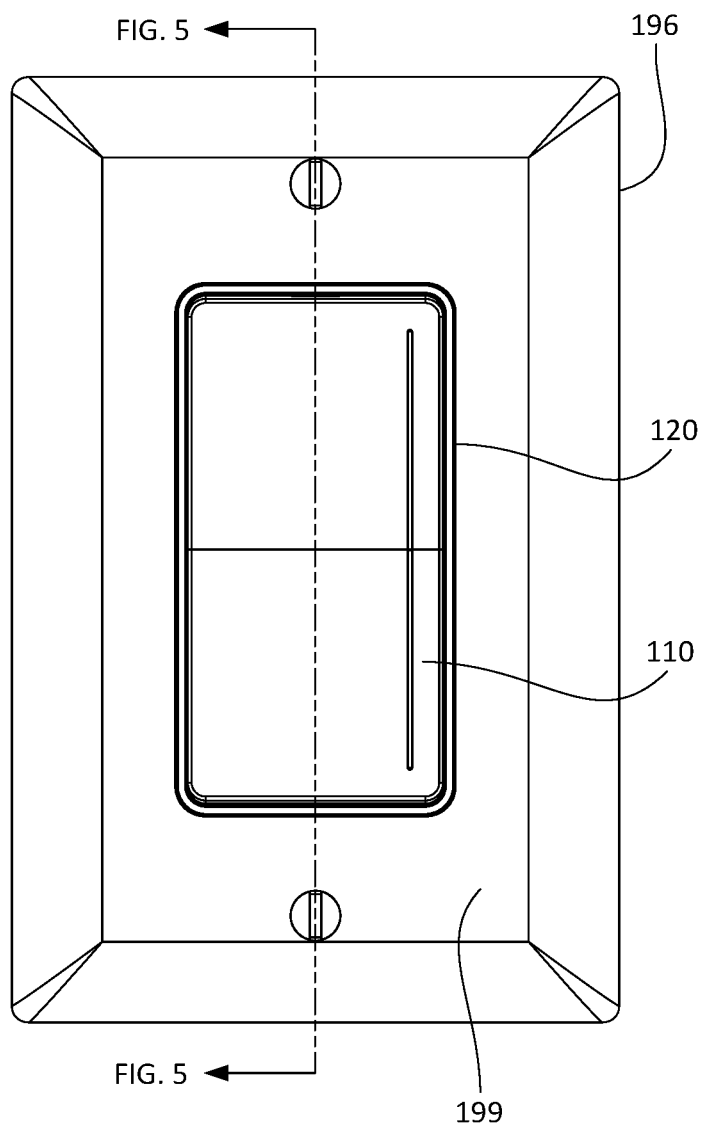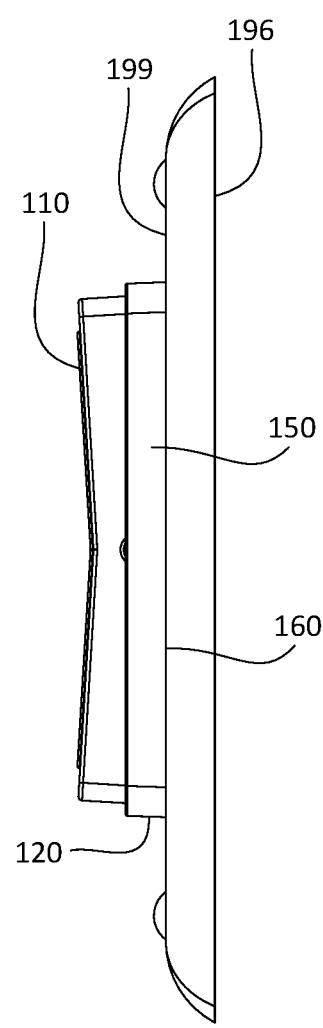
FIG. 4A
FIG. 4B
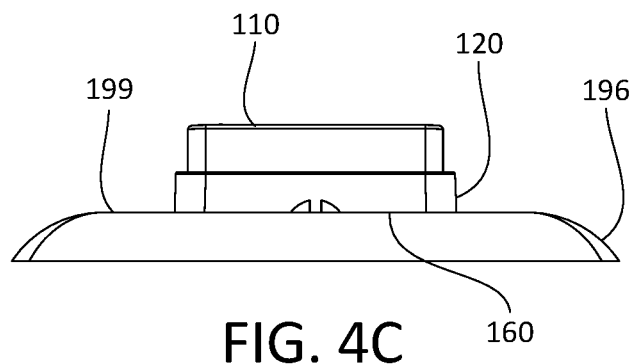
FIG. 4C

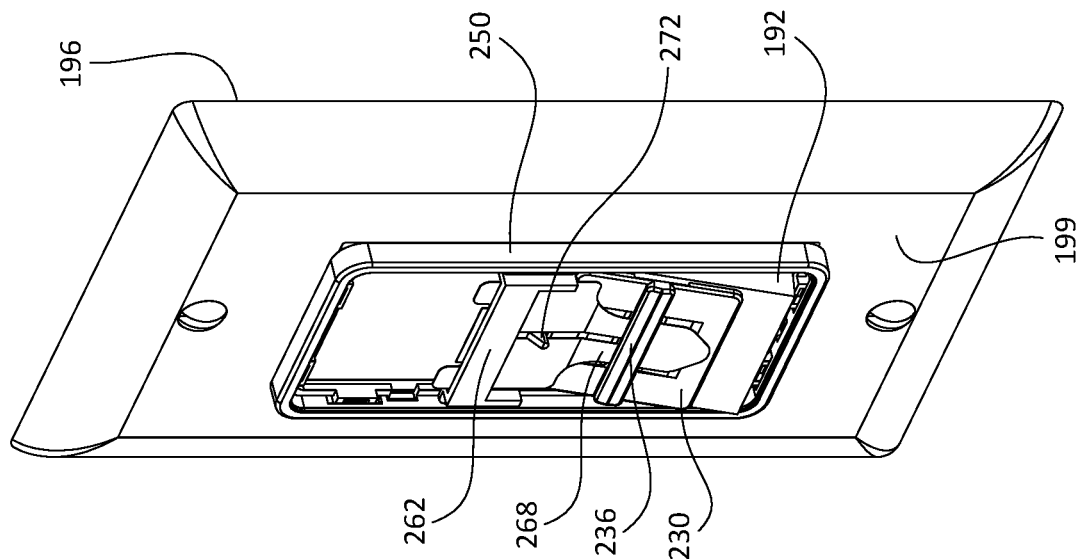
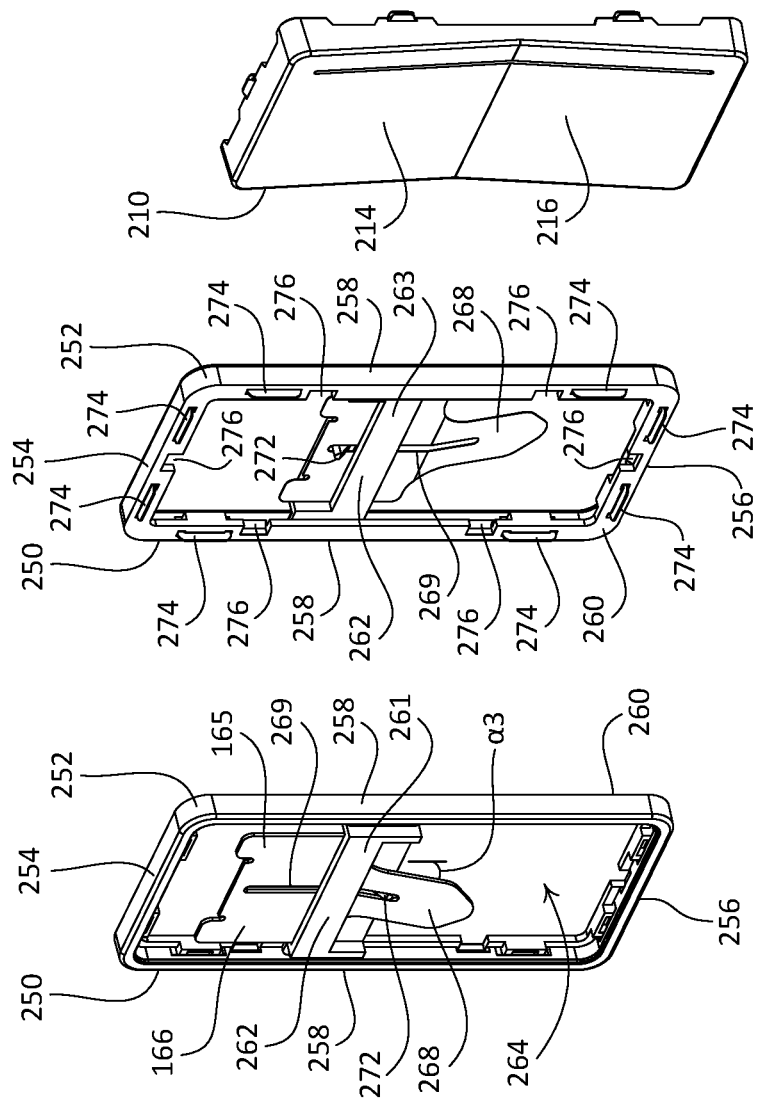
FIG. 9
FIG. 8B
FIG. 8A

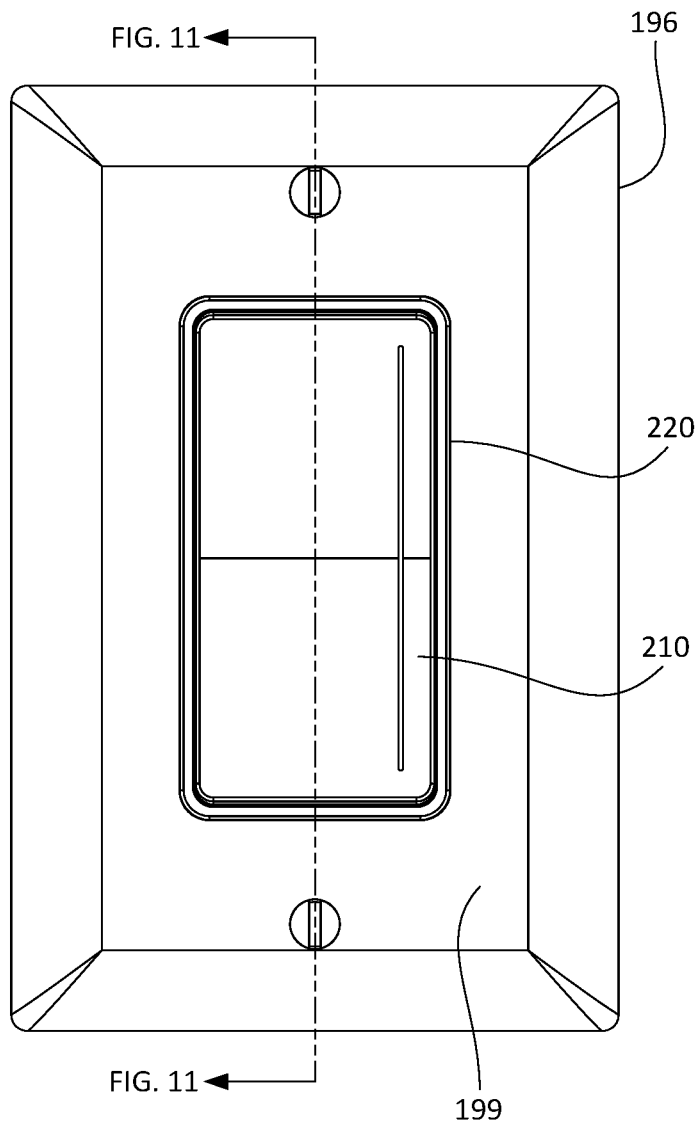
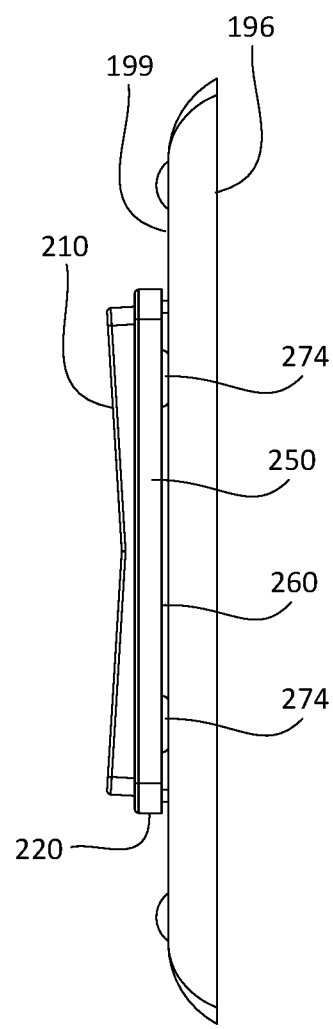
FIG. 10A
FIG. 10B
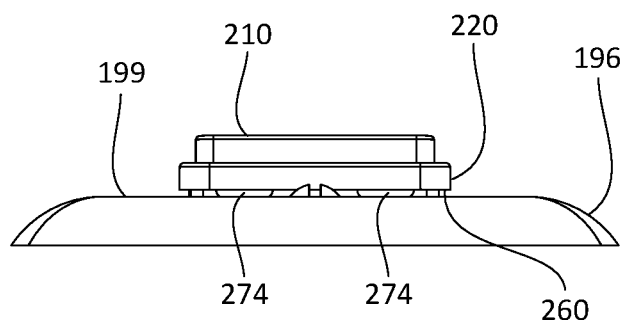
FIG. 10C

CONTROL DEVICE BASE THAT ATTACHES TO THE PADDLE ACTUATOR OF A MECHANICAL SWITCH

CROSS-REFERENCE TO RELATED APPLICATIONS

This application is a continuation of U.S. patent application Ser. No. 17/141,881, filed Jan. 5, 2021, which is a continuation of U.S. patent application Ser. No. 16/583,784, filed on Sep. 26, 2019, issued as U.S. Pat. No. 10,916,385 on Feb. 9, 2021, which is a continuation of U.S. patent application Ser. No. 16/018,957, filed Jun. 26, 2018, issued as U.S. Pat. No. 10,475,596 on Nov. 12, 2019, which claims priority from U.S. Provisional Patent Application No. 62/526,323, filed Jun. 28, 2017, the contents of which are in their entireties incorporated hereby reference.

BACKGROUND

In load control systems, standard mechanical switches (e.g., decorator paddle switches, etc.) may be replaced with more advanced load control devices, such as dimmer switches, that control the amount of power delivered from an alternating-current (AC) power source to an electrical load. This procedure typically requires that the old decorator paddle switch be un-wired and removed from the load control system and the new load control device to be connected to the electrical wiring. Typically, such a procedure must be performed by an electrical contractor or other skilled installer. The average consumer may not feel comfortable to complete the installation of the load control device. Accordingly, there is a need for a load control system that may be installed in an existing installation having a decorator paddle switch without requiring any electrical work, and that is aesthetically pleasing.

SUMMARY

As described herein, a remote control device for use in a load control system, for example to control electrical loads and/or load control devices, may be configured to be mounted over an installed mechanical switch having a paddle actuator. The mechanical switch may control whether power is delivered to an electrical load. The remote control device may be installed without accessing electrical wiring of the mechanical switch.

The remote control may include a base and a control unit that is configured to be removably attached to the base. The control unit may include a control interface and a wireless communication circuit. The control unit may translate a user input received at the control interface into a control signal that controls a load control device. The control unit may cause the wireless communication circuit to transmit the control signal.

The base may include a mounting tab and a frame. The mounting tab may be configured to be attached to a protruding portion of the paddle actuator of the mechanical switch. For example, the mounting tab may define an attachment surface that is configured to be secured to the paddle actuator, for example using a double-sided adhesive. The frame may define an opening that is configured to receive the protruding portion of the paddle actuator therein. The frame may be configured to allow attachment of the control unit to the frame. The frame may be configured to receive a battery for powering the control unit, and may include a printed circuit board that is configured to electrically couple the control unit to the battery when the control unit is attached to the frame.

When the remote control device is mounted over the mechanical switch, the base may cause a rear surface of the frame to be biased against a structure of the mechanical switch, such as the bezel that surrounds the paddle actuator or the faceplate of the mechanical switch. The base may include one or more alignment members that extends from the rear surface of the frame. The alignment members may be configured to be received in a gap that is defined between the bezel and the opening of the faceplate.

In an example implementation of the base, the mounting tab may be monolithic with the frame, and may define an attachment surface that is angularly offset relative to the rear surface of the frame. The frame may include an outer wall that extends along a perimeter of the frame, and a cross member that extends between opposed side walls of the perimeter wall. The mounting tab may extend outward from a fixed end that is supported by the cross member, to a free end.

In another example implementation of the base, the base may further include a resilient attachment member that extends from the frame and that is configured to engage with the mounting tab. The mounting tab may be configured to receive and captively retain the attachment member. The attachment member may include a first portion that is supported by the frame and a second portion that defines a tab that extends outward from the first portion. The mounting tab may define a channel that is configured to receive the tab. The frame and the attachment member may be configured such that the attachment member is held in a fixed in position when supported by the frame.

In another example implementation of the base, the base may further include a resilient attachment member that extends from the frame and that is configured to engage with the mounting tab. The mounting tab may be configured to receive and captively retain the attachment member. The attachment member may include a first portion that is supported by the frame and a second portion that defines a tab that extends outward from the first portion. The mounting tab may define a channel that is configured to receive the tab. The frame and the attachment member may configured such that the attachment member is translatable relative to the frame when supported by the frame.

BRIEF DESCRIPTION OF THE DRAWINGS

FIG. 4A is a front view of the example remote control device and light switch illustrated in FIG. 1.

FIG. 4B is a side view of the example remote control device and light switch illustrated in FIG. 1.

FIG. 4C is a bottom view of the example remote control device and light switch illustrated in FIG. 1.

FIG. 8A is a front perspective view of a frame component of the example remote control device illustrated in FIG. 6, with a tongue component of the remote control device attached to the frame and operated to a release position.

FIG. 8B is a rear perspective view of a frame component of the example remote control device illustrated in FIG. 6, with the tongue operated to a locked position.

FIG. 9 is a perspective view of the example remote control device illustrated in FIG. 6, with the frame of the remote control device attached to a paddle actuator of the light switch and with a control unit component of the remote control device detached from the frame.

FIG. 10A is a front view of the example remote control device and light switch illustrated in FIG. 6.

FIG. 10B is a side view of the example remote control device and light switch illustrated in FIG. 6.

FIG. 10C is a bottom view of the example remote control device and light switch illustrated in FIG. 6.

DETAILED DESCRIPTION

Figure 1:
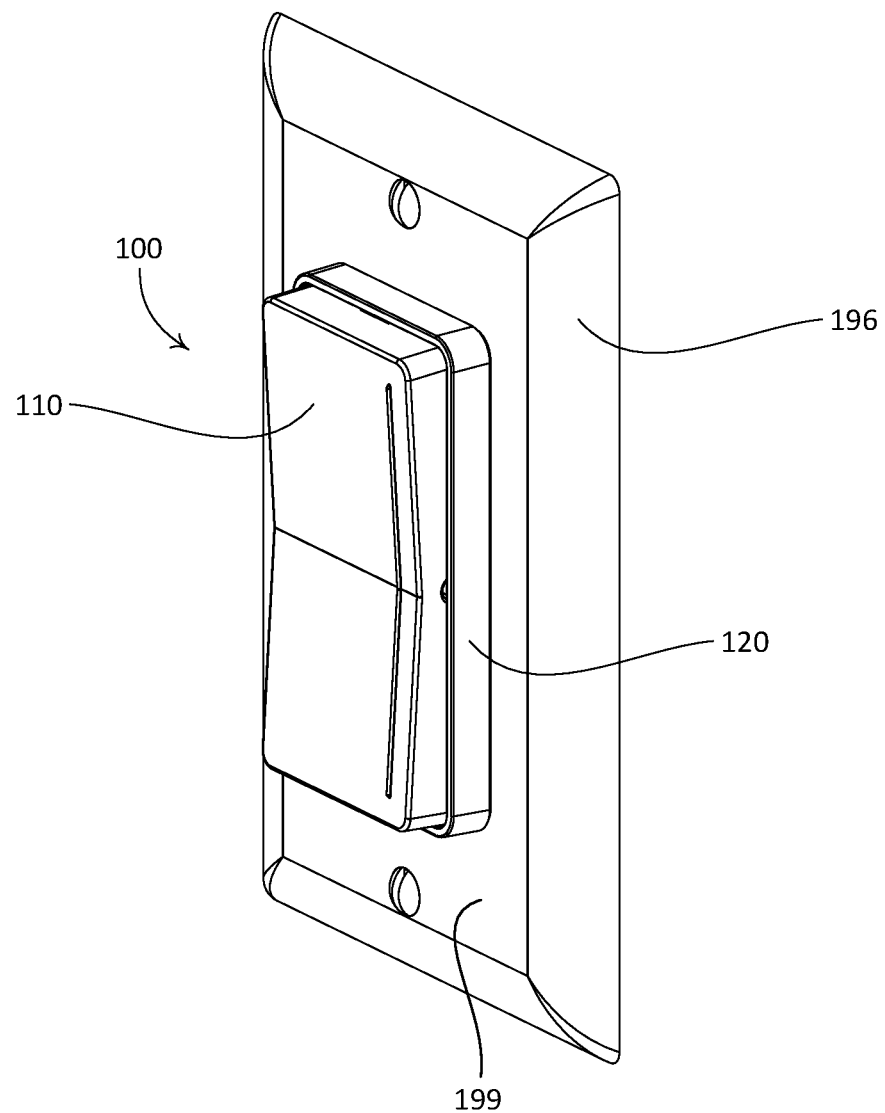
FIG. 1 is a perspective view of an example remote control device, with the remote control device mounted in an installed position over a light switch.

FIGS. 1-5 depict an example remote control device 100 that may be installed in a load control system, such as a lighting control system. The load control system may include a mechanical switch, such as the illustrated mechanical switch 190, that may be in place prior to installation of the remote control device 100, for example pre-existing in the load control system. As shown, the mechanical switch 190 may be a standard decorator paddle switch. The load control system may further include one or more electrical loads, such as lighting loads. The mechanical switch 190 may be coupled in series electrical connection between an alternating current (AC) power source and the one or more electrical loads (not shown).

The mechanical switch 190 may include a paddle actuator 192 that may be actuated to turn on and/or turn off, the one or more electrical loads. The mechanical switch 190 may include a bezel 194 that surrounds the paddle actuator 192. The mechanical switch 190 may include a yoke (not shown) that enables mounting of the mechanical switch 190 to a structure. For example, the yoke of the illustrated mechanical switch 190 may be fastened to a single-gang wallbox that is installed in an opening of a wall. As shown, a faceplate 196 may be secured to the mechanical switch 190, for instance to the yoke. The faceplate 196 may define an opening 198 that extends therethrough. The opening 198 may be sized to receive the bezel 194 therein, such that a narrow gap 197 is defined between the bezel 194 and the opening 198 around the perimeter of the bezel 194. As shown, with the faceplate 196 secured to the mechanical switch 190, the bezel 194 may protrude beyond an outer surface 199 of the faceplate 196. The outer surface 199 of the faceplate 196 may alternatively be referred to as a front surface of the faceplate 196.

Figure 2A:
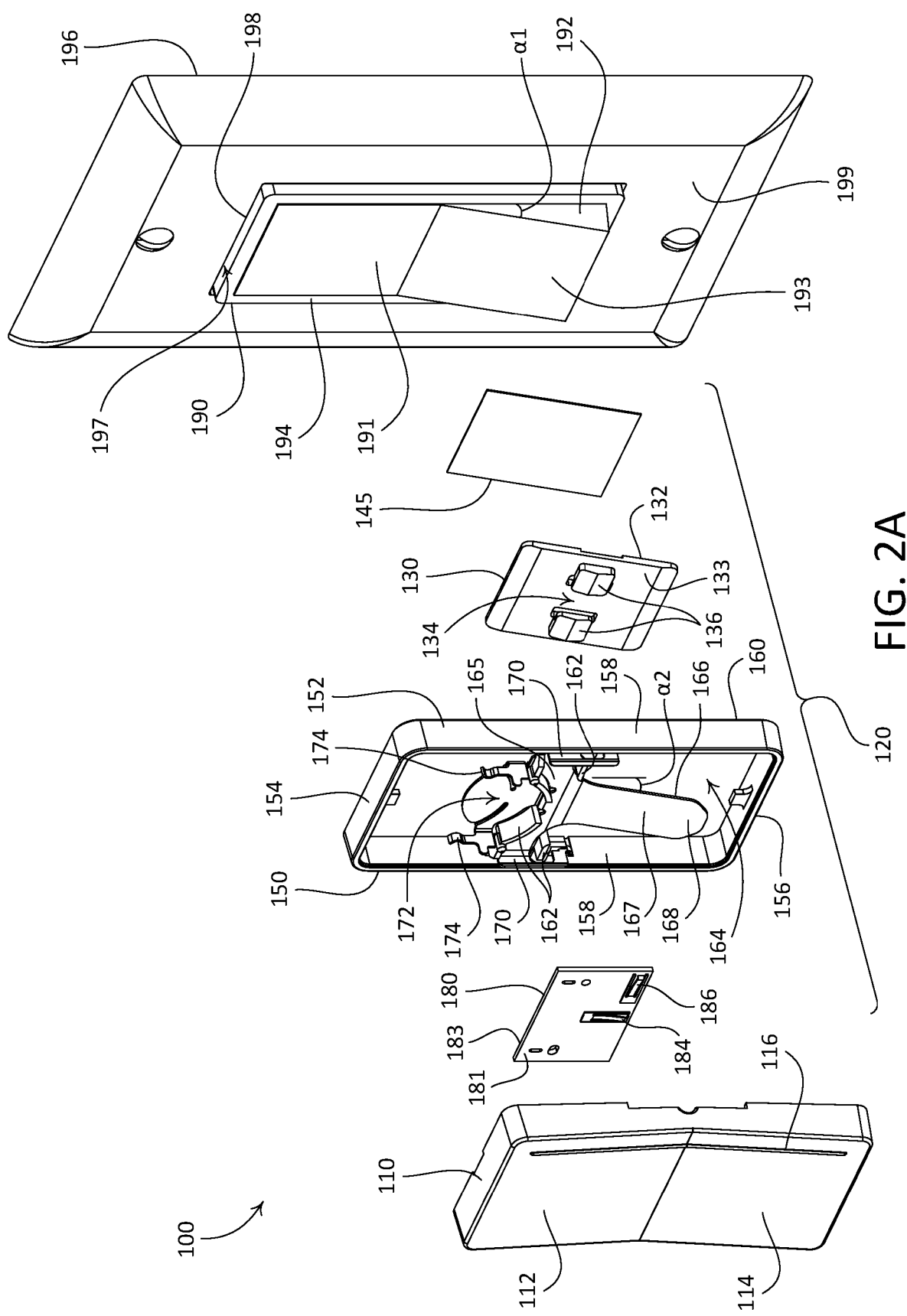
FIG. 2A is an exploded view of the example remote control device illustrated in FIG. 1, before the remote control device is mounted to the light switch.

In accordance with the illustrated orientation of the mechanical switch 190, an upper portion of the paddle actuator 192 may define a first actuation surface 191 that may be pressed to operate the paddle actuator 192 into a first position (e.g., as shown in FIG. 2A) from a second position, and a lower portion of the paddle actuator 192 may define a second actuation surface 193 that may be pressed to operate the paddle actuator 192 from the first position into the second position. As shown, the first position of the paddle actuator 192 may correspond to an "on" position of the mechanical switch 190, which corresponds to the mechanical switch 190 allowing power from the AC power source to be delivered to the one or more electrical loads. With the paddle actuator 192 in the first, or "on" position, the lower portion of the paddle actuator 192 may project outward relative to the bezel 194 and the faceplate 196, and may be referred to as a protruding portion of the paddle actuator 192. It should be appreciated that in an alternative configuration in which the second position of the paddle actuator 192 corresponds to the "on" position of the mechanical switch 190, the upper portion of the paddle actuator 192 may project outward relative to the bezel 194 and the faceplate 196, and thus may be referred to as the protruding portion of the paddle actuator 192.

The load control system may further include a load control device (not shown) that is electrically connected to the one or more electrical loads. The load control device may include a load control circuit for controlling the intensity of one or more of the electrical loads between a low end intensity (e.g., approximately 1%) and a high-end intensity (e.g., approximately 100%), and may include a wireless communication circuit. In an example implementation, the load control device may be a standalone dimmer switch that is electrically connected to the one or more electrical loads. In another example implementation, each of the one more electrical loads may be a controllable light source (e.g., a screw-in light-emitting diode (LED) lamp) that each may include a respective integrated load control circuit and wireless communication circuit (e.g., the electrical load includes a corresponding load control device that is configured for wireless communication). It should be appreciated that the load control system is not limited to the example load control devices described herein.

As shown, the example remote control device 100 may include a control unit 110 and a base 120 that may operate as a mount for the control unit 110. The base 120 may alternatively be referred to as a base portion or a mounting assembly. The control unit 110 and the base 120 may be configured such that the control unit 110 may be removably attached to the base 120. The base 120 may be attached to the paddle actuator 192 of the mechanical switch 190 without removing the faceplate 196. In this regard, the remote control device 100 may be mounted over an installed mechanical switch, such as the mechanical switch 190, without performing any electrical re-wiring of the mechanical switch 190.

As shown, the base 120 may include a mounting tab 130 and a frame 150. The mounting tab 130 may be configured to be attached to the protruding portion of the paddle actuator 192 of the mechanical switch 190. For example, as shown the mounting tab 130 may have a rectangular-shaped body that defines an attachment surface 132 that is configured to be secured (e.g., adhered) to the protruding portion of the paddle actuator 192. The attachment surface 132 may be adhered, for example, using double-sided adhesive such as the illustrated sheet 145 of double-sided adhesive as shown in FIG. 2A. The mounting tab 130 may be made of any suitable material, such as plastic. It should be appreciated that attachment of the mounting tab 130 to the paddle actuator 192 is not limited to double-sided adhesive, and that the mounting tab 130 may be alternatively configured to otherwise attach to the protruding portion of the paddle actuator 192, for example mechanically (e.g., using one or more fasteners).

As shown, the frame 150 may include an outer wall 152 that extends along a perimeter of the frame 150. The outer wall 152 may alternatively be referred to as a perimeter wall of the frame 150. The outer wall 152 may include a first end wall 154, an opposed second end wall 156, and opposed side walls 158 that extend from respective ends of the first end wall 154 to corresponding ends of the second end wall 156. In accordance with the illustrated orientation of the frame 150, the first end wall 154 may be referred to as an upper end wall of the frame 150 and the second end wall 156 may be referred to as a lower end wall of the frame 150. The outer wall 152 may define a rear surface 160 of the frame 150.

In accordance with the illustrated configuration of the frame 150, the frame 150 may be configured such that the outer wall 152 encloses and does not interfere with the bezel 194 when the frame 150 is placed over the bezel 194, and such that the rear surface 160 of the frame 150 abuts the outer surface 199 of the faceplate 196. It should be appreciated that the outer wall 152 of the frame 150 is not limited to the illustrated geometry. For example, the frame 150 may be alternatively configured such that the outer wall 152 (e.g., at least a portion of the rear surface 160 of the frame 150) abuts the bezel 194 when the base 120 is attached to the protruding portion of the paddle actuator 192. In another example, the frame 150 may be alternatively configured such that the outer wall 152 encloses the faceplate 196 of the mechanical switch 190, for instance such that the rear surface 160 of frame 250 abuts a surface of a structure in which the mechanical switch 190 is installed, such as a surface of a wall.

Figure 3:
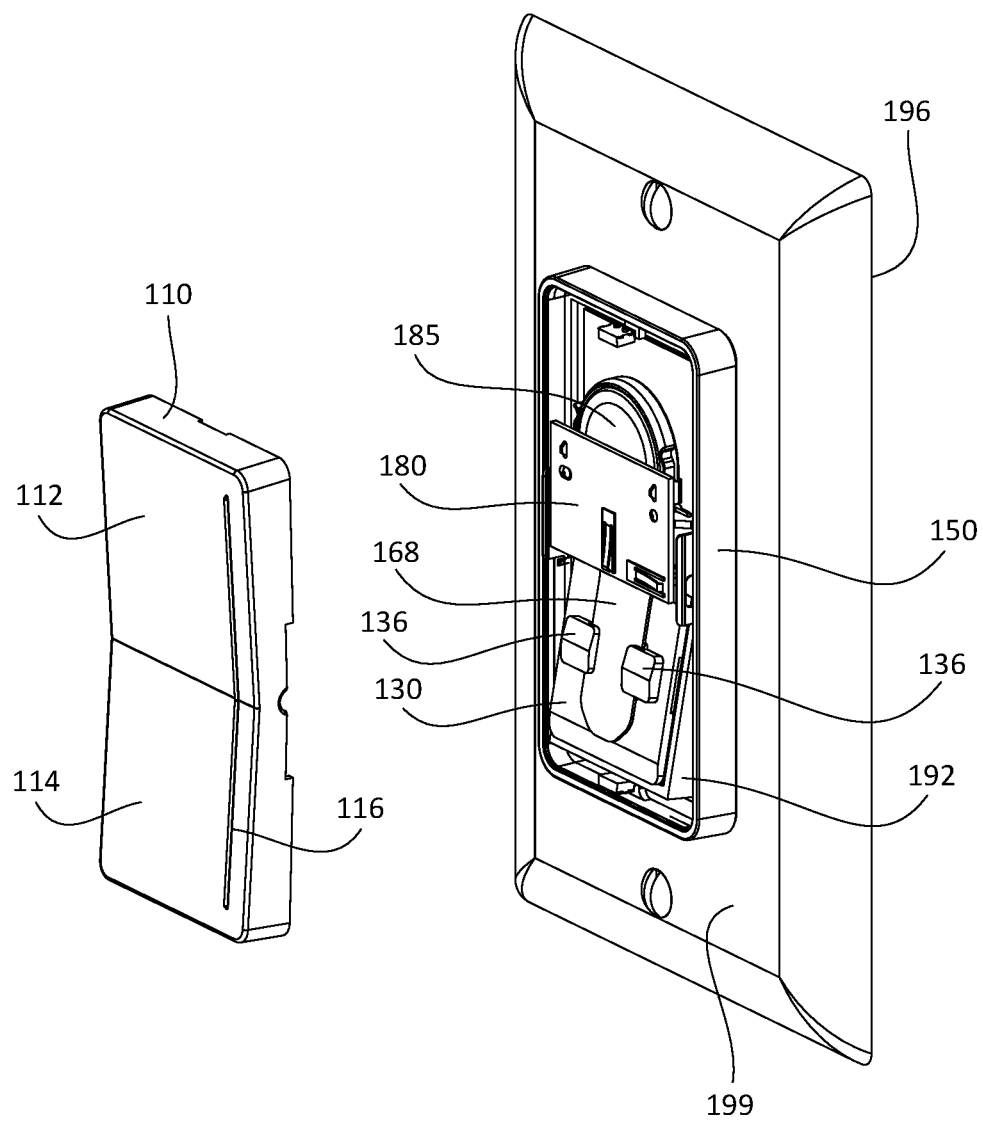
FIG. 3 is a perspective view of the example remote control device illustrated in FIG. 1, with a frame component of the remote control device attached to a paddle actuator of the light switch and with a control unit component of the remote control device detached from the frame.
Figure 5:
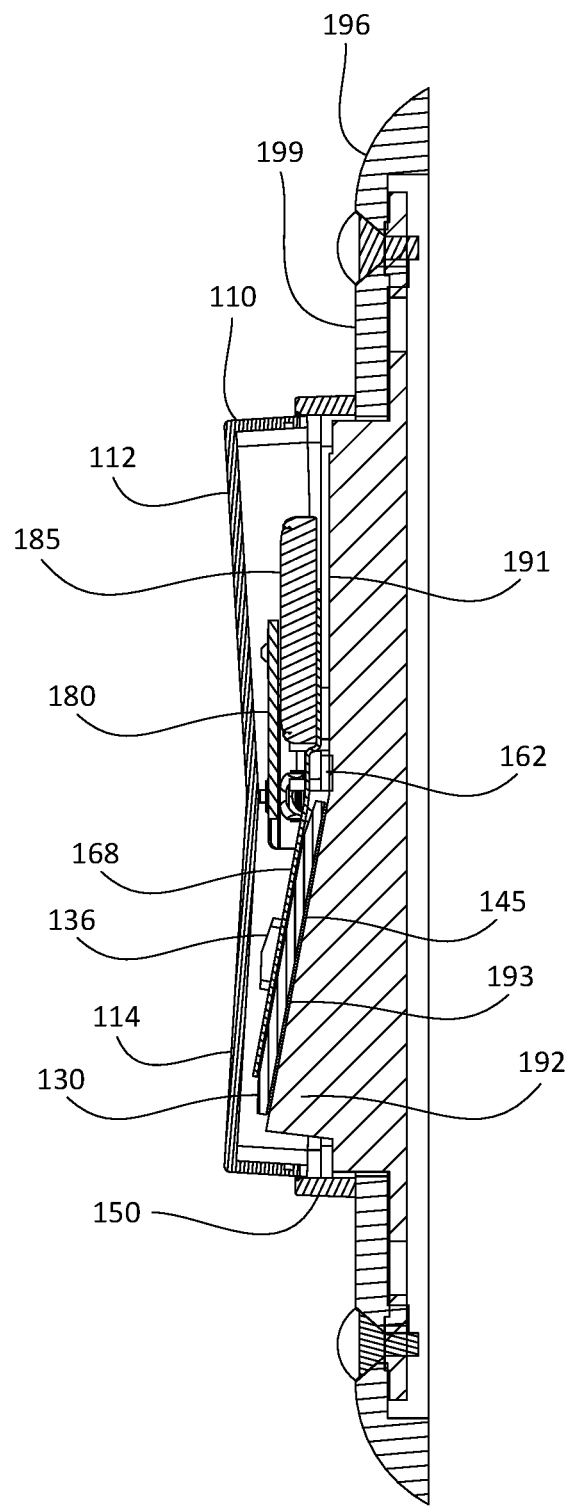
FIG. 5 is a side cross-section view of the example remote control device and light switch illustrated in FIG. 1.
Figure 6:
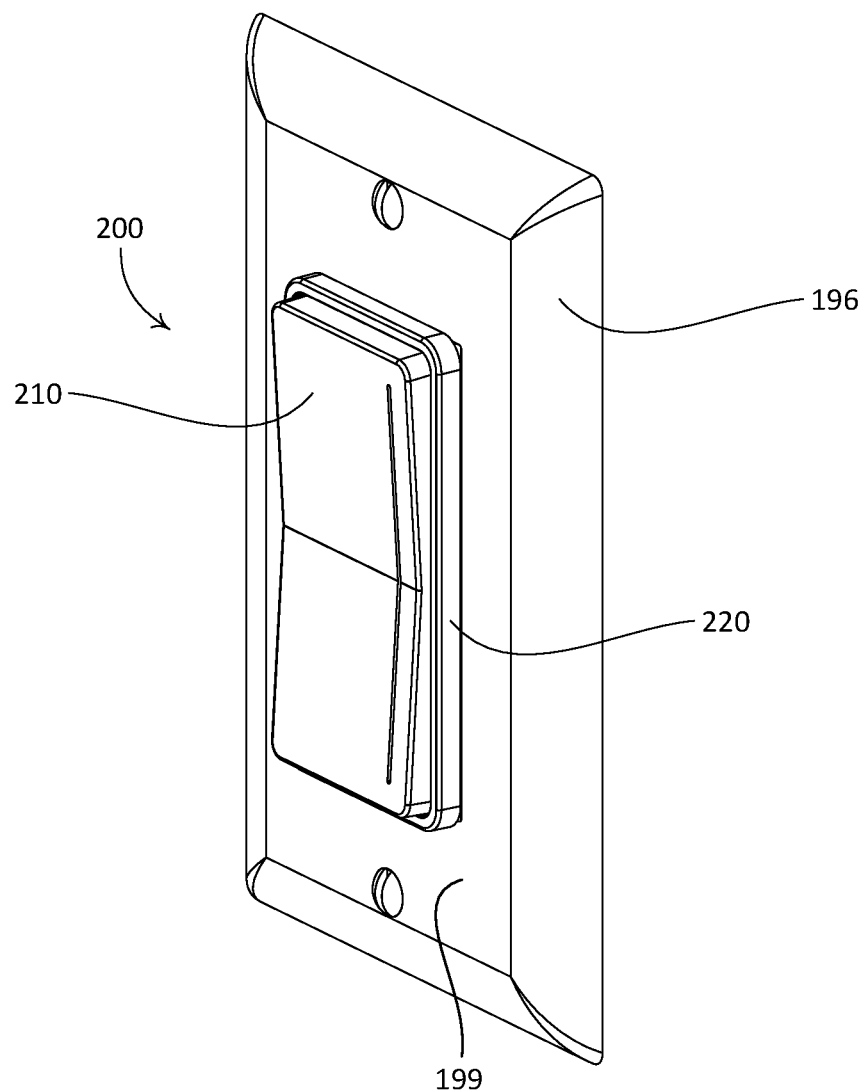
FIG. 6 is a perspective view of another example remote control device, with the remote control device mounted in an installed position over a light switch.

The frame 150 may further include a cross member 162 that extends between the opposed side walls 158 of the outer wall 152 (e.g., from a first one of the side walls 158 to the other side wall 158). The frame 150 may define an opening 164 that extends therethrough. The opening 164 may be configured to receive the protruding portion of the paddle actuator 192 therein. When the protruding portion of the paddle actuator 192 is received in the opening 164, the frame 150 may at least partially surround the paddle actuator 192 (e.g., as shown in FIG. 3). The frame 150 may be made of any suitable material, such as plastic.

The base 120 may further include an attachment member 166 that may be configured to engage with the mounting tab 130 so as to secure the frame 150 to the mounting tab 130. The attachment member 166 may include a first portion 165 that is configured to be attached to the frame 150. For example, as shown the first portion 165 of the attachment member 166 may be configured to be attached to the cross member 162 and the opposed side walls 158 of the frame 150. In accordance with the illustrated configuration of the frame 150, the first portion 165 of the attachment member 166 may be supported by the frame 150 such that the first portion 165 is fixed in position relative to the frame 150. The attachment member 166 may further include a second portion 167 that defines a tab 168 that extends outward from the first portion 165. In this regard, the attachment member 166 may extend from the frame 150. The attachment member 166 may be a resilient attachment member. For example, the attachment member 166 may be made of a suitably resilient material, such as metal.

The mounting tab 130 may be configured to receive and captively retain the attachment member 166. For example, as shown the mounting tab 130 may define a channel 134 that is configured to receive the tab 168 of the attachment member 166 therein. In accordance with the illustrated configuration of the mounting tab 130, the mounting tab 130 may include a pair of opposed ledges 136 that define the channel 134. The ledges 136 may be configured such that the channel 134 is wider than a width of the tab 168. This may allow lateral (e.g., side-to-side) movement of the frame 150 when the tab 168 is received in the channel 134, which may in turn allow alignment of the base 120 relative to the mechanical switch 190, for instance via one or more optional alignment members (not shown) that may protrude from the frame 150 and that may be configured to be received in the gap 197 between the bezel 194 and the opening 198 of the faceplate 196.

The mounting tab 130 and the frame 150 may be configured to, when the base 120 is attached to the paddle actuator 192 of the mechanical switch 190, cause the rear surface 160 of the frame 150 to be biased against a structure that surrounds the paddle actuator 192, such as the bezel 194 or the outer surface 199 of the faceplate 196. As shown (e.g., in FIG. 2A), the second actuation surface 193 of the protruding portion of the paddle actuator 192 may form a first angle $\alpha 1$ relative to the bezel 194 of the mechanical switch 190, and the tab 168 may extend from the first portion 165 of the attachment member 166 at a second angle $\alpha 2$ relative to the rear surface 160 of the frame 150. The second angle $\alpha 2$ may be smaller than the first angle $\alpha 1$.

The mounting tab 130 may be configured such that when the tab 168 is disposed into the channel 134, the ledges 136 may bias the tab 168 against an outer surface 133 of the mounting tab 130. Accordingly, when the mounting tab 130 is attached to the protruding portion of the paddle actuator 192 and the tab 168 is received in the channel 134, the tab 168 may deflect due to the size difference between the second angle $\alpha 2$ and the first angle $\alpha 1$. This deflection of the tab 168 may cause the first portion 165 of the attachment member 166 to be biased rearward, thereby causing the rear surface 160 of the frame 150 to be biased against the outer surface 199 of the faceplate 196. This may minimize, or eliminate, gapping between the rear surface 160 of the frame 150 and the outer surface 199 of the faceplate 196.

The base 120 and the control unit 110 may be configured to enable releasable attachment of the control unit 110 to the base 120. For example, one or more components of the base 120 may include engagement features that may be configured to engage with complementary engagement features of the control unit 110. As shown, the attachment member 166 may define a pair of resilient clips 170 that may be configured to engage with complementary engagement features (not shown) defined on corresponding inner surfaces of the control unit 110. In this regard, the frame 150 may be configured for releasable attachment of the control unit 110 to the frame 150, via the attachment member 166.

The control unit 110 may define a control interface that is configured to receive inputs, such as finger presses and/or gestures, from a user of the remote control device 100. For example, in accordance with the illustrated configuration, the control unit 110 may be configured to pivot about a central axis, when attached to the base 120, in response to actuations of respective upper and lower portions 112, 114 of the control unit 110. The control unit 110 may further define a capacitive touch surface along the upper and lower portions 112, 114, that may be configured to detect touches along an x axis, a y axis, or both an x and y axis.

The control unit 110 may include a control circuit (not shown) and a wireless communication circuit (not shown). The control unit 110 may be configured to translate one or more inputs (e.g., user inputs) from the control interface into respective control signals that may be used to control a load control device of a load control system. The one or more inputs may be applied via touches or presses of the upper portion 112 and/or lower portion 114 of the control unit 110. For example, the control circuit may be configured to receive input signals (e.g., that correspond to the user inputs) in response to actuations of the upper portion 112 and/or lower portion 114 by a user of the remote control device 100. For example, the input signals received by the control circuit may be the respective control signals translated from the control interface inputs. The control circuit may be configured to generate commands that the user desires the control unit 110 to execute in response to the input signals produced in response to actuations of the upper portion 112 and/or lower portion 114. The control unit 110 may be configured to cause the wireless communication circuit to transmit one or more control signals including the commands generated by the control circuit.

The control unit 110 may be configured to provide a visual indication associated with inputs and/or gestures received by the upper portion 112 and/or lower portion 114. For example, the control unit 110 may further include a plurality of light emitting diodes (LEDs) (not shown) that are configured to provide the visual indication. In accordance with the illustrated control unit 110, the plurality of LEDs in a linear array that extends between the upper and lower ends of the control unit 110. The control unit 110 may include a light bar 116 that may be configured to allow light, for instance from one or more of the LEDs, to be emitted outward from an interior of the control unit 110. For example, the light bar 116 may comprise a light pipe that is disposed in a slot that extends into an outer surface of the control unit 110 (e.g., through a body of the control unit). In another example, a body of the control unit 110 may be made of a translucent material that may be coated with an opaque material (e.g., an opaque paint) and an opening for light emitted from the light bar 116 may be defined by removing a corresponding portion of the opaque material. It should be appreciated that the control unit 110 is not limited to the illustrated geometry of the light bar 116.

The control circuit may be configured to cause the wireless communication circuit to transmit respective commands that correspond to inputs and/or gestures received by the upper portion 112 and/or lower portion 114. For example, the remote control device 100 may be operable to transmit wireless signals, for example radio frequency (RF) signals, to a load control device, one or more electrical loads, and/or a central processor of a load control system. The remote control device 100 may be associated with the load control device and the one or more electrical loads during a configuration procedure of the load control system.

The control unit 110 may be battery-powered. The frame 150 may be configured to receive a battery 185 for powering the control unit 110. The remote control device 100 may optionally include the battery 185. As shown, the first portion 165 of the attachment member 166 and the cross member 162 may define a cradle 172 configured to receive the battery 185. The first portion 165 of the attachment member 166 may define a pair of positive battery contacts 174. The base 120 may be configured to provide power from the battery 185 to the control unit 110 when the control unit 110 is attached to the base 120. For example, the base 120 may include a battery printed circuit board (PCB) 180 that may be mounted to the frame 150 (e.g., to posts that protrude from the cross member 162). As shown, the battery PCB 180 may define a front side 181 and an opposed rear side 183. The battery PCB 180 may include a negative battery contact (not shown) mounted to the rear side 183, and that may make contact with the battery 185 when the battery PCB 180 is attached to the frame 150. The battery PCB 180 may also include a circuit common contact 184 and a supply voltage contact 186 mounted to the front side 181 of the battery PCB 180.

Figure 2B:
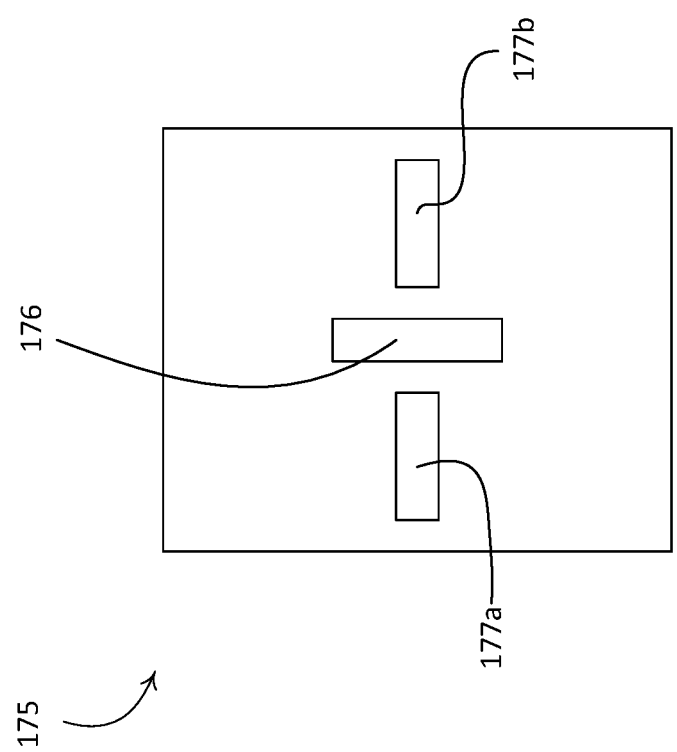
FIG. 2B is a front view of an example control printed circuit board (PCB) of the example remote control device illustrated in FIG. 1.

The control unit 110 may be configured such that power may be transferred from the battery 185 to the control unit 110 via the circuit common contact 184 and the supply voltage contact 186, regardless of whether the base 120 is attached to the paddle actuator 192 of the mechanical switch 190 with the paddle actuator 192 in the first position (e.g., as shown in FIG. 2A) or in the second position. For example, the control unit 110 may include a control PCB 175 that includes a centrally located circuit common electrical pad 176, and a pair of supply voltage electrical pads 177A, 177B that flank the circuit common electrical pad 176, for example, as shown in FIG. 2B. In accordance with such a configuration of the control PCB 175 of the control unit 110, when the control unit 110 is attached to the frame 150 in a first orientation (e.g., when the paddle actuator 192 is in the first position), the circuit common contact 184 of the battery PCB 180 makes contact with the circuit common electrical pad 176 of the control PCB 175 of the control unit 110, and the supply voltage contact 186 of the battery PCB 180 makes contact with a first supply voltage electrical pad 177A of the control PCB 175 of the control unit 110 (e.g., but not a second supply voltage electrical pads 177B). When the control unit 110 is attached to the frame 150 in a second orientation (e.g., 180 degrees flipped from the first orientation and when the paddle actuator 192 is in the second position), the circuit common contact 184 of the battery PCB 180 makes contact with the circuit common electrical pad 176 of the control PCB 175 of the control unit 110, and the supply voltage contact 186 of the battery PCB 180 makes contact with the second supply voltage electrical pad 177B of the control PCB 175 of the control unit 110 (e.g., but not the first supply voltage electrical pads 177A). In this regard, the battery PCB 180 of the base 120 may be configured to, when the control unit 110 is attached to the frame 150 in either the first orientation or the second orientation, electrically couple the control unit 110 to the battery 185. Alternatively, the control unit 110 may be configured to derive power from a power source connected to the mechanical switch 190, such as the source of AC power for example. Alternatively still, the control unit 310 may be configured to house the battery 185.

In an example process of attaching the base 120 to the paddle actuator 192 of the mechanical switch 190, the mounting tab 130 may be adhered to the protruding portion of the paddle actuator 192 (e.g., the second actuation surface 193 when the paddle actuator 192 is in the first position as shown) with the sheet 145 of double-sided adhesive. The frame 150, with the attachment member 166 attached thereto, may then be secured to the mounting tab 130 by inserting the tab 168 into the channel 134 of the mounting tab 130. As the tab 168 is received in the channel 134, the rear surface 160 of the frame 150 may be biased against the outer surface 199 of the faceplate 196, for example as described herein. With the base 120 attached to the paddle actuator 192 (e.g., as shown in FIG. 3), the control unit 110 may be attached to the base 120.

FIGS. 6-11 depict another example remote control device 200 that may be installed in a load control system, such as a lighting control system. The load control system may include a mechanical switch, such as the mechanical switch 190, that may be in place prior to installation of the remote control device 200, for example pre-existing in the load control system. The load control system may further include one or more electrical loads, such as lighting loads. The mechanical switch 190 may be coupled in series electrical connection between an alternating current (AC) power source and the one or more electrical loads (not shown). The load control system may further include a load control device (not shown) that is electrically connected to the one or more electrical loads, as described herein.

As shown, the example remote control device 200 may include a control unit 210 and a base 220 that may operate as a mount for the control unit 210. The base 220 may alternatively be referred to as a base portion or a mounting assembly. The control unit 210 and the base 220 may be configured such that the control unit 210 may be removably attached to the base 220. The base 220 may be attached to the paddle actuator 192 of the mechanical switch 190 without removing the faceplate 196. In this regard, the remote control device 200 may be mounted over an installed mechanical switch, such as the mechanical switch 190, without performing any electrical re-wiring of the mechanical switch.

Figure 7:
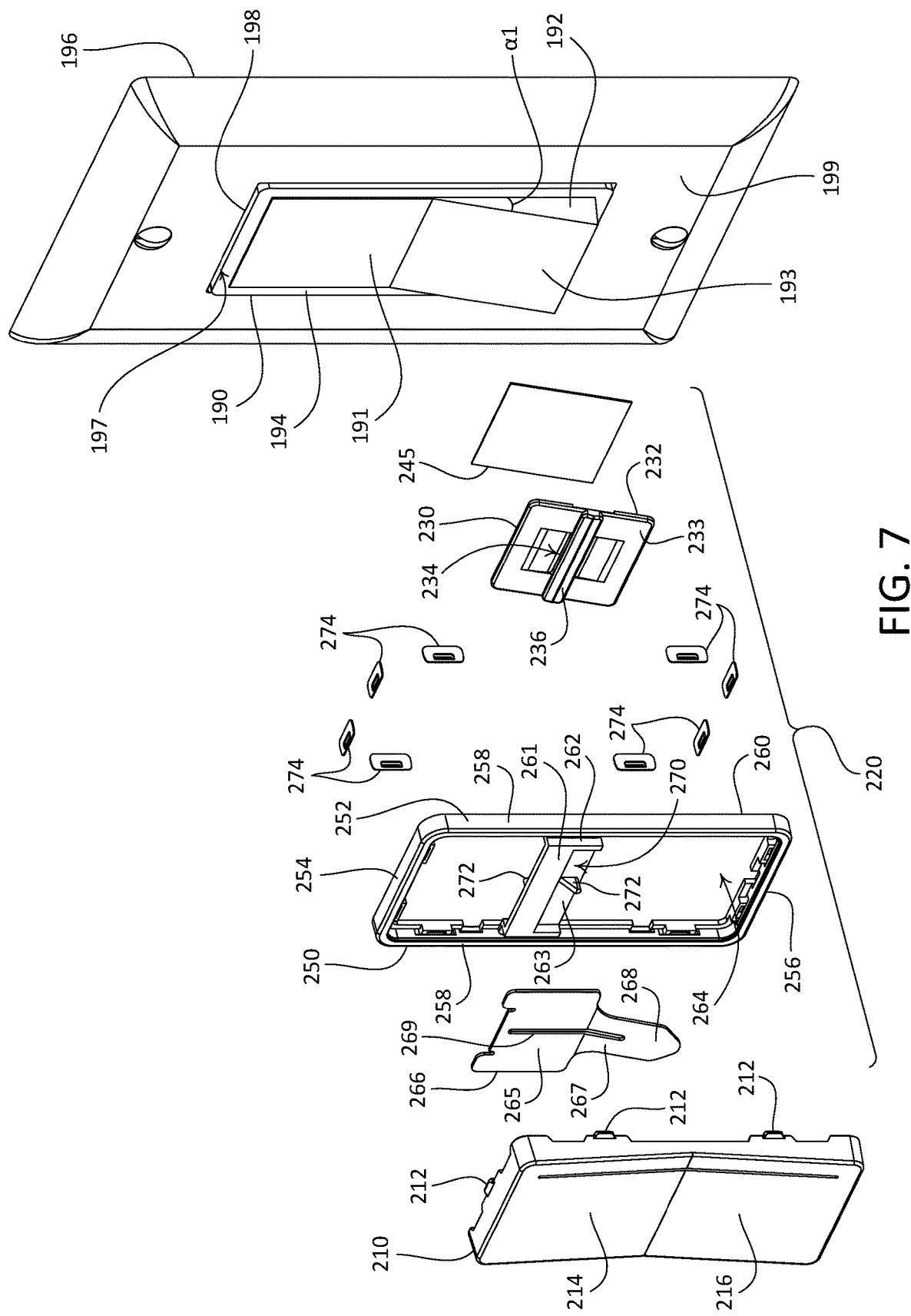
FIG. 7 is an exploded view of the example remote control device illustrated in FIG. 6, before the remote control device is mounted to the light switch.

As shown, the base 220 may include a mounting tab 230 and a frame 250. The mounting tab 230 may be configured to be attached to the protruding portion of the paddle actuator 192 of the mechanical switch 190. For example, as shown the mounting tab 230 may have a rectangular-shaped body that defines an attachment surface 232 that is configured to be adhered to the protruding portion of the paddle actuator 192. The attachment surface 232 may be adhered, for example, using double-sided adhesive such as the illustrated sheet 245 of double-sided adhesive as shown in FIG. 7. The mounting tab 230 may be made of any suitable material, such as plastic. It should be appreciated that attachment of the mounting tab 230 to the paddle actuator 192 is not limited to double-sided adhesive, and that the mounting tab 230 may be alternatively configured to otherwise attach to the protruding portion of the paddle actuator 192, for example mechanically (e.g., using one or more fasteners).

As shown, the frame 250 may include an outer wall 252 that extends along a perimeter of the frame 250. The outer wall 252 may alternatively be referred to as a perimeter wall of the frame 250. The outer wall 252 may include a first end wall 254, an opposed second end wall 256, and opposed side walls 258 that extend from respective ends of the first end wall 254 to corresponding ends of the second end wall 256. In accordance with the illustrated orientation of the frame 250, the first end wall 254 may be referred to as an upper end wall of the frame 250 and the second end wall 256 may be referred to as a lower end wall of the frame 250. The outer wall 252 may define a rear surface 260 of the frame 250.

In accordance with the illustrated configuration of the frame 250, the frame 250 may be configured such that the outer wall 252 (e.g., at least a portion of the rear surface 260 of the frame 250) abuts the bezel 194 when the base 220 is attached to the protruding portion of the paddle actuator 192. It should be appreciated that the outer wall 252 of the frame 250 is not limited to the illustrated geometry. For example, the frame 250 may be alternatively configured such that the outer wall 252 encloses the bezel 194 of the mechanical switch 190 and the rear surface 260 of frame 250 abuts the outer surface 199 of the faceplate 196. In another example, the frame 250 may be alternatively configured such that the outer wall 252 encloses the faceplate 196 of the mechanical switch 190, for instance such that the rear surface 260 of frame 250 abuts a surface of a structure in which the mechanical switch 190 is installed, such as a surface of a wall.

As shown, the frame 250 may be configured such that one or more outer perimeter surfaces of the outer wall 252 protrude beyond corresponding outer perimeter surfaces of the bezel 194 of the mechanical switch 190. It should be appreciated that the outer wall 252 of the frame 250 is not limited to the illustrated geometry. For example, the frame 250 may be alternatively configured such that the outer perimeter surfaces of the outer wall 252 are flush with, or recessed relative to, corresponding outer perimeter surfaces of the bezel 194 of the mechanical switch 190. Such a configuration may allow the faceplate 196 of the mechanical switch 190 to be removed without detaching the frame 250 from the paddle actuator 192 of the mechanical switch 190.

The frame 250 may further include a cross member 262 that extends between the opposed side walls 258 of the outer wall 252 (e.g., from a first one of the side walls 258 to the other side wall 258). The frame 250 may define an opening 264 that extends therethrough. The opening 264 may be configured to receive the protruding portion of the paddle actuator 192 therein. When the protruding portion of the paddle actuator 192 is received in the opening 264, the frame 250 may at least partially surround the paddle actuator 192 (e.g., as shown in FIG. 9). The frame 250 may be made of any suitable material, such as plastic.

The base 220 may further include an attachment member 266 that may be configured to engage with the mounting tab 230 so as to secure the frame 250 to the mounting tab 230. The attachment member 266 may include a first portion 265 and a second portion 267 that defines a tab 268. As shown, the tab 268 may extend outward from the first portion 265. In this regard, the attachment member 266 may extend from the frame 250. The attachment member 266 may be made of a suitably resilient material, such as metal.

The attachment member 266 may be configured to be translatable relative to the frame 250. For example, as shown the attachment member 266 may define a slot 269 that extends therethrough. The slot 269 may extend from the first portion 265 into the second portion 267. The frame 250 may be configured to captively support the attachment member 266 such that the attachment member 266 is translatable relative to the frame 250. For example, as shown the cross member 262 may include a front wall 261 and an opposed rear wall 263 that is spaced from the front wall 261. The front and rear walls 261, 263 may define a pocket 270 that is configured to receive the attachment member 266 therein. The first portion 265 of the attachment member 266 may define a square shape that may be received in the pocket 270. The frame 250 may be configured to support the attachment member 266 such that the first portion 265 is fixed in position relative to the frame 250. The cross member 262 may be configured to captively retain the attachment member 266 such that the attachment member 266 is slidable within the pocket 270. For example, as shown each of the front and rear walls 261, 263 includes a post 272 that extends inward into the pocket 270. The posts 272 may be configured to be received in the slot 269 of the attachment member 266.

The posts 272 may operate as stops for sliding movement of the attachment member 266 in the pocket 270. For example, the attachment member 266 may be slid upwards toward the first end wall 254 until a lower end of the slot 269 abuts the post 272 that extends from the rear wall 263 of the cross member 262. This position of the attachment member 266, as shown in FIG. 8A, may be referred to a raised position of the attachment member 266. The attachment member 266 may be slid downward toward the second end wall 256 until an upper end of the slot 269 abuts the post 272 that extends from the front wall 261 of the cross member 262. This position of the attachment member 266, as shown in FIG. 8B, may be referred to a lowered position of the attachment member 266.

The mounting tab 230 may be configured to receive and captively retain the attachment member 266. For example, as shown the mounting tab 230 may define a channel 234 that is configured to receive the tab 268 of the attachment member 266 therein. The channel 234 may be recessed into an outer surface 233 of the mounting tab 230. In accordance with the illustrated configuration of the mounting tab 230, the mounting tab 230 may include a bridge 236 that extends across, and may define a portion of, the channel 234.

The base 220 may be configured to facilitate alignment of the frame 250 relative to the mechanical switch 190, for instance during attachment of the base 220 to the paddle actuator 192 of the mechanical switch 190. For example, the base 220 may further include one or more alignment members that may be configured to be received in the gap 197 between the bezel 194 of the mechanical switch 190 and the opening 198 of the faceplate 196. The gap 197 may be defined as between the bezel 194 of the mechanical switch 190 that surrounds the paddle actuator 192 and the opening 198 that extends through the faceplate 196 that is attachable to the yoke of the mechanical switch 190. The one or more alignment members may extend from the rear surface 260 of the frame 250. As shown, the base 220 may include a plurality of alignment tabs 274 that may be received in slots (not shown) that extend into the rear surface 260 of the frame 250. When disposed in the respective slots of the frame 250, the alignment tabs 274 may extend outward from the rear surface 260 of the frame 250 such that the extending portions of the alignment tabs 274 may be received in the gap 197.

The mounting tab 230 and the frame 250 may be configured to, when the base 220 is attached to the paddle actuator 192 of the mechanical switch 190, cause the rear surface 260 of the frame 250 to be biased against a structure that surrounds the paddle actuator 192, such as the bezel 194 or the outer surface 199 of the faceplate 196. As shown (e.g., in FIG. 8A), the tab 268 may extend from the first portion 265 of the attachment member 266 at a third angle $\alpha 3$ relative to the rear surface 260 of the frame 250. The third angle $\alpha 3$ may be smaller than the first angle $\alpha 1$ formed by the second actuation surface 193 of the protruding portion of the paddle actuator 192 relative to the bezel 194 of the mechanical switch 190 (e.g., as shown in FIG. 7).

The mounting tab 230 may be configured such that when the tab 268 is disposed into the channel 234 and under the bridge 236, the bridge 236 may bias the tab 268 against the outer surface 233 of the mounting tab 230. Accordingly, when the mounting tab 230 is attached to the protruding portion of the paddle actuator 192 and the tab 268 is received in the channel 234, the tab 268 may deflect due to the size difference between the third angle $\alpha 3$ and the first angle $\alpha 1$. This deflection of the tab 268 may cause the first portion 265 of the attachment member 266 to be biased rearward, thereby causing the rear surface 260 of the frame 250 to be biased against the bezel 194 of the mechanical switch 190. This may ensure uniform spacing between the rear surface 260 of the frame 250 and the outer surface 199 of the faceplate 196 (e.g., as shown in FIGS. 10B-10C).

The base 220 and the control unit 210 may be configured to enable releasable attachment of the control unit 210 to the base 220. For example, one or more components of the base 220 may include engagement features that may be configured to engage with complementary engagement features of the control unit 210. As shown, the outer wall 252 of the frame 250 may define a plurality of recessed ledges 276 that may be configured to engage with corresponding resilient snap-fit connectors 212 that extend rearward from the control unit 210. In this regard, the frame 250 may be configured for releasable attachment of the control unit 210 to the frame 250, via the attachment member 266.

The control unit 210 may be configured to function similarly to the control unit 110, but may omit the feature of pivoting about a central axis as included in the control unit 110. For example, the control unit 210 may be configured to remain in a fixed position when attached to the frame 250, such that respective upper and lower portions 214, 216 of the control unit 210 may not be actuated with presses. The control unit 210 may define a control interface that is configured to receive inputs, such as gestures, from a user of the remote control device 200. The control unit 210 may define a capacitive touch surface along the upper and lower portions 214, 216, that may be configured to detect touches along an x axis, a y axis, or both an x and y axis.

Figure 11:
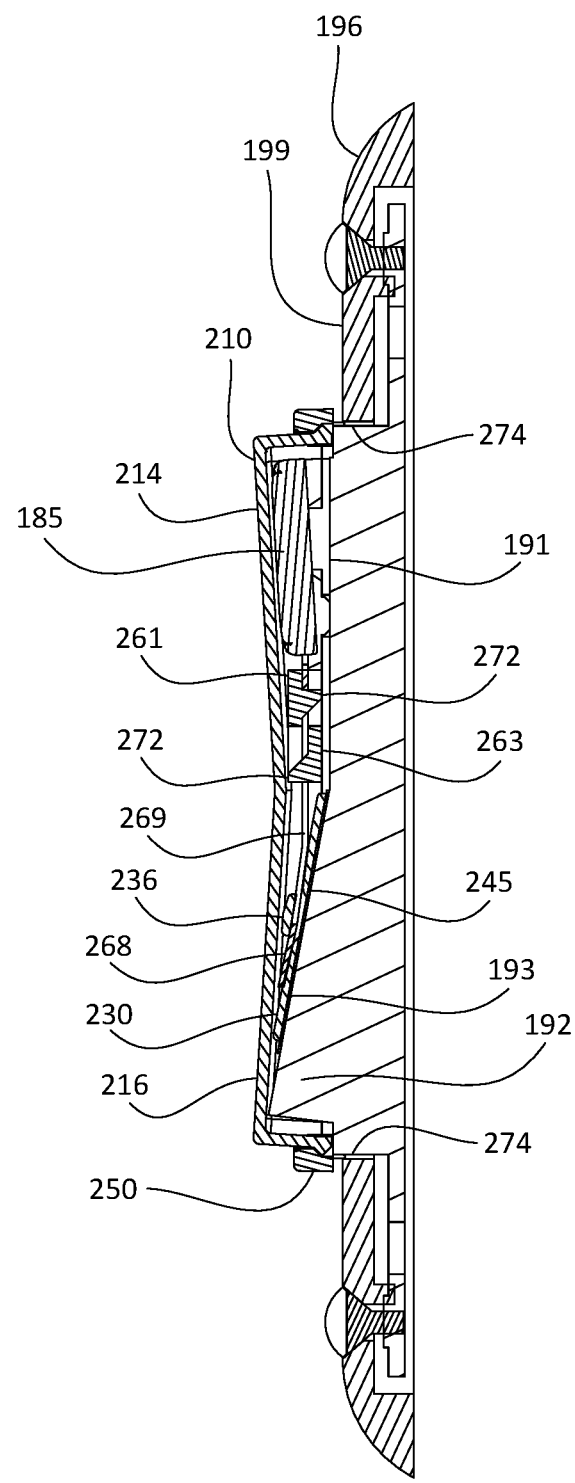
FIG. 11 is a side cross-section view of the example remote control device and light switch illustrated in FIG. 6.
Figure 12:
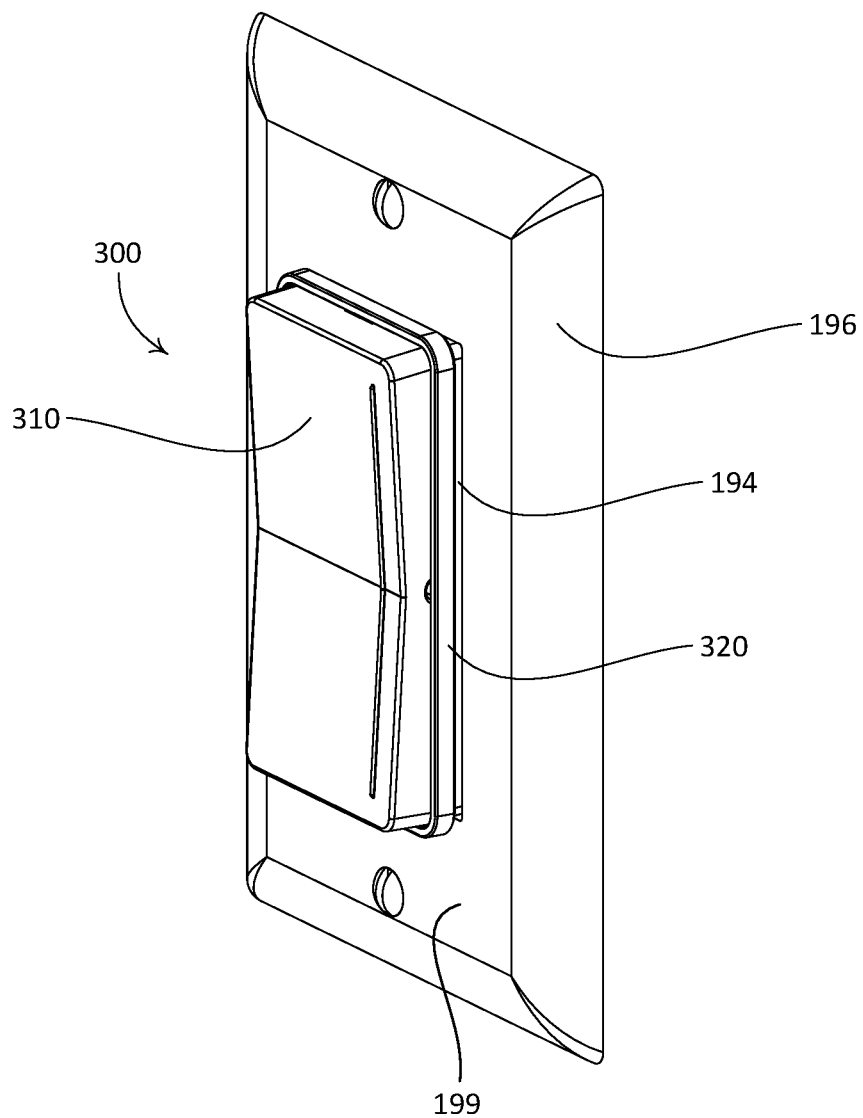
FIG. 12 is a perspective view of another example remote control device, with the remote control device mounted in an installed position over a light switch.

The control unit 210 may be battery-powered. The frame 250 may be configured to receive a battery 185 (e.g., as shown in FIG. 11) for powering the control unit 210. The base 220 may be configured to provide power from the battery 185 to the control unit 210 when the control unit 210 is attached to the base 220. For example, the base 220 may include a battery PCB (not shown) that may be mounted to the frame 250, and that may operate similarly to the battery PCB 180 of the base 120 of the remote control device 100 to transfer power from the base 220 to the control unit 210.

The control unit 210 may be configured such that power may be transferred from the battery 185 to the control unit 210 via the battery PCB of the base 220. For example, the control unit 210 may include a control PCB (not shown) that may be configured similarly to the control PCB 175 of the control unit 110. In this regard, the battery PCB of the base 220 may be configured to, when the control unit 210 is attached to the frame 250, electrically couple the control unit 210 to the battery 185. Alternatively, the control unit 210 may be configured to derive power from a power source connected to the mechanical switch 190, such as the source of AC power for example. Alternatively still, the control unit 210 may be configured to house the battery 185.

In an example process of attaching the base 220 to the paddle actuator 192 of the mechanical switch 190, the mounting tab 230 may be adhered to the protruding portion of the paddle actuator 192 (e.g., the second actuation surface 193 when the paddle actuator 192 is in the first position as shown) with the sheet 245 of double-sided adhesive. The frame 250, with the attachment member 266 captively disposed in the pocket 270, may then be secured to the mounting tab 230. For example, the attachment member 266 may be operated to the raised position, and the frame 250 may be positioned against the bezel 194 of the mechanical switch 190 such that the alignment tabs 274 are received in the gap 197. With the frame 250 so positioned, the attachment member 266 may be operated from the raised position to the lowered position, such that the tab 268 is disposed into the channel 234 of the mounting tab 230. As the tab 268 is received in the channel 234, the rear surface 260 of the frame 250 may be biased against the bezel 194 of the mechanical switch 190, for example as described herein. With the base 220 attached to the paddle actuator 192 (e.g., as shown in FIG. 9), the control unit 210 may be attached to the base 220.

FIGS. 12-17 depict another example remote control device 300 that may be installed in a load control system, such as a lighting control system. The load control system may include a mechanical switch, such as the mechanical switch 190, that may be in place prior to installation of the remote control device 300, for example pre-existing in the load control system. The load control system may further include one or more electrical loads, such as lighting loads. The mechanical switch 190 may be coupled in series electrical connection between an alternating current (AC) power source and the one or more electrical loads (not shown), such as a controllable light source. The load control system may further include one or more load control devices (not shown) that are electrically connected to the one or more electrical loads and/or integral to the one or more electrical loads, as described herein.

As shown, the example remote control device 300 may include a control unit 310 and a base 320 that may operate as a mount for the control unit 310. The base 320 may alternatively be referred to as a base portion or a mounting assembly. The control unit 310 and the base 320 may be configured such that the control unit 310 may be removably attached to the base 320. The base 320 may be attached to the paddle actuator 192 of the mechanical switch 190 without removing the faceplate 196. In this regard, the remote control device 300 may be mounted over an installed mechanical switch, such as the mechanical switch 190, without performing any electrical re-wiring of the mechanical switch.

Figure 13:
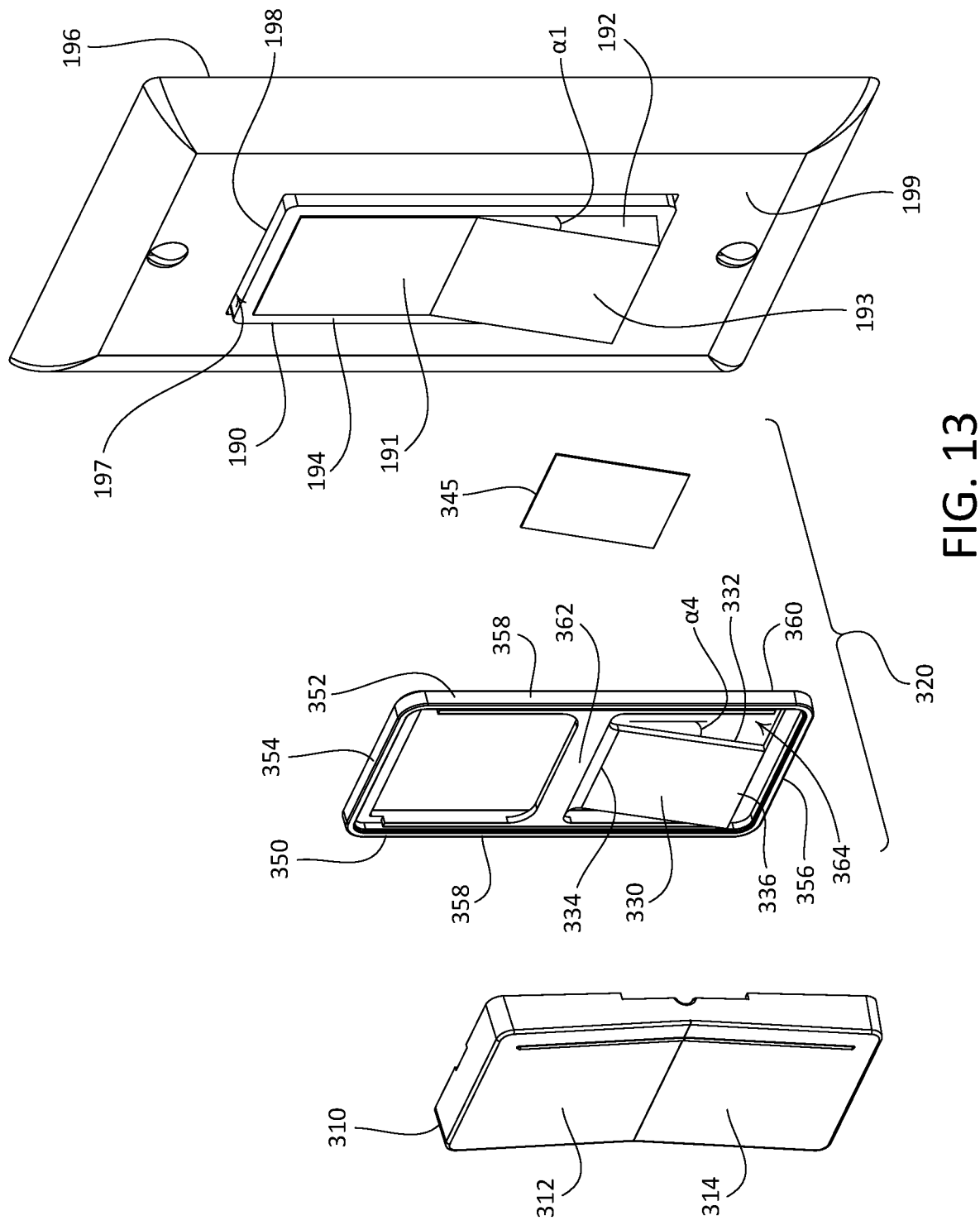
FIG. 13 is an exploded view of the example remote control device illustrated in FIG. 12, including an example configuration of a frame component of the remote control device, before the remote control device is mounted to the light switch.
Figure 14B:
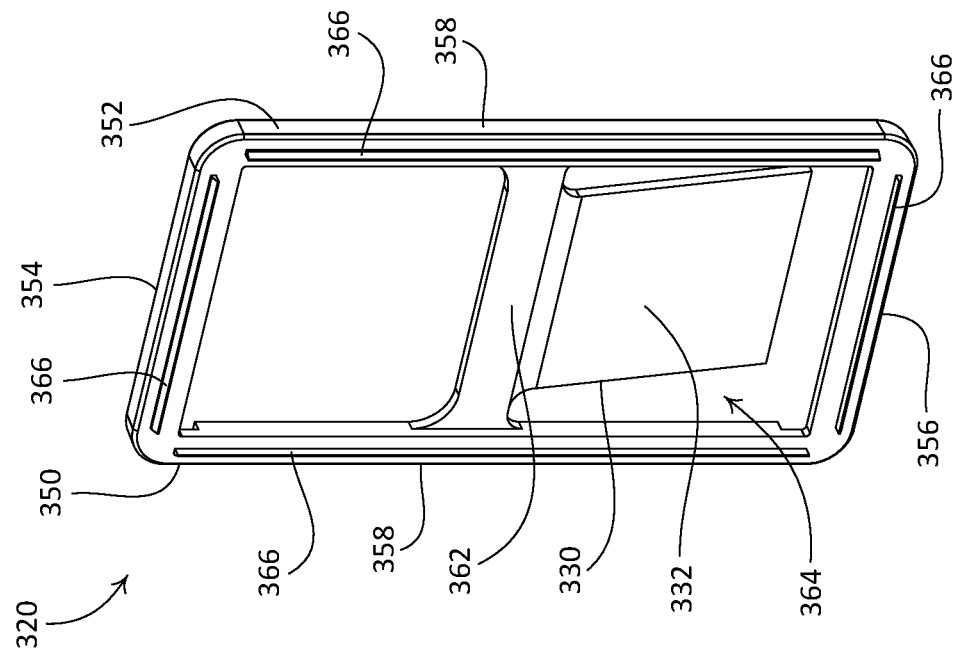
FIG. 14B is a rear perspective view of the frame illustrated in FIG. 13.
Figure 14A:
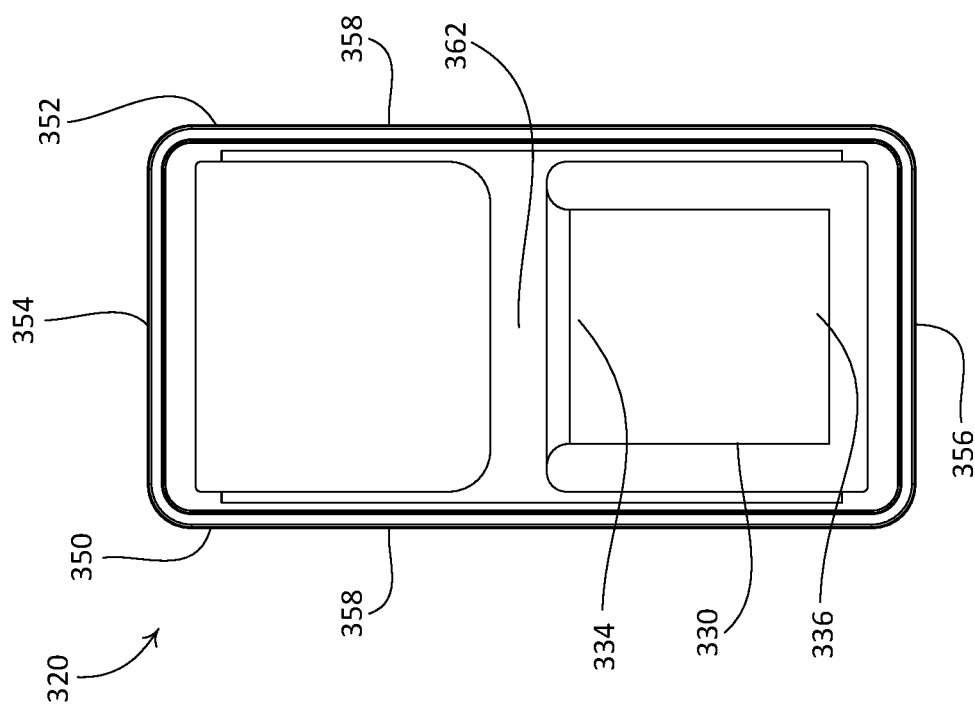
FIG. 14A is a front view of the frame illustrated in FIG. 13.
Figure 16:
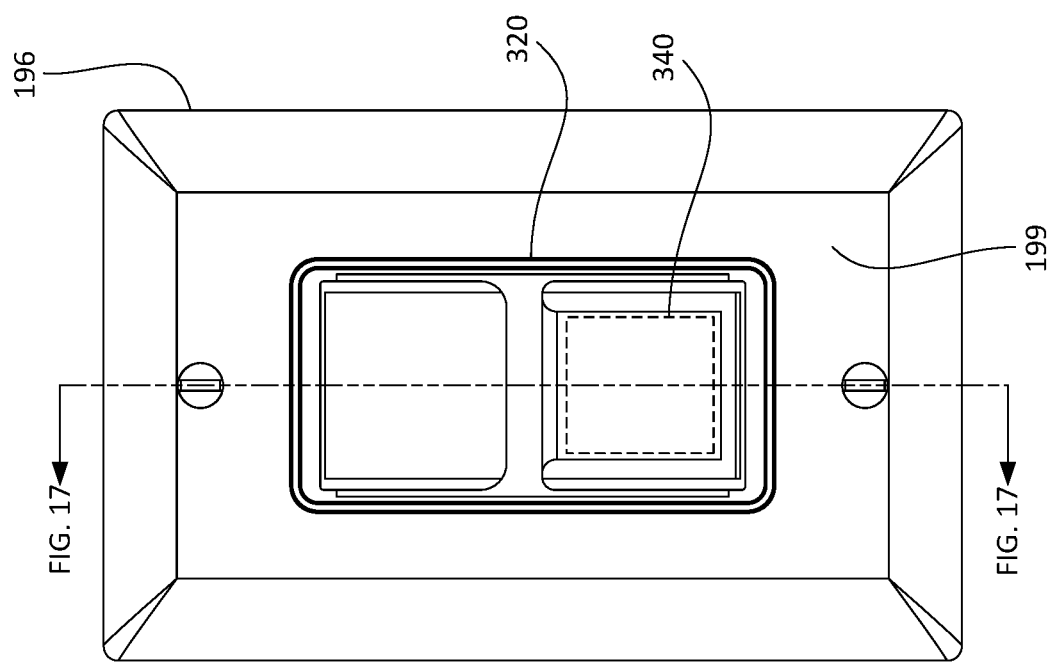
FIG. 16 is a front view of the example remote control device and light switch illustrated in FIG. 12.

As shown, the base 320 may include a mounting tab 330 and a frame 350. The mounting tab 330 may be configured to be attached to the protruding portion of the paddle actuator 192 of the mechanical switch 190. For example, as shown the mounting tab 330 may have a rectangular-shaped body that defines an attachment surface 332 that is configured to be adhered to the protruding portion of the paddle actuator 192. The attachment surface 332 may be adhered, for example, using double-sided adhesive such as the illustrated sheet 345 of double-sided adhesive as shown in FIG. 13. The mounting tab 330 may be made of any suitable material, such as plastic. It should be appreciated that attachment of the mounting tab 330 to the paddle actuator 192 is not limited to double-sided adhesive, and that the mounting tab 330 may be alternatively configured to otherwise attach to the protruding portion of the paddle actuator 192, for example mechanically (e.g., using one or more fasteners).

As shown, the frame 350 may include an outer wall 352 that extends along a perimeter of the frame 350. The outer wall 352 may alternatively be referred to as a perimeter wall of the frame 350. The outer wall 352 may include a first end wall 354, an opposed second end wall 356, and opposed side walls 358 that extend from respective ends of the first end wall 354 to corresponding ends of the second end wall 356. In accordance with the illustrated orientation of the frame 350, the first end wall 354 may be referred to as an upper end wall of the frame 350 and the second end wall 356 may be referred to as a lower end wall of the frame 350. The outer wall 352 may define a rear surface 360 of the frame 350.

In accordance with the illustrated configuration of the frame 350, the frame 350 may be configured such that the outer wall 352 (e.g., at least a portion of the rear surface 360 of the frame 350) abuts the bezel 194 when the base 320 is attached to the protruding portion of the paddle actuator 192. It should be appreciated that the outer wall 352 of the frame 350 is not limited to the illustrated geometry. For example, the frame 350 may be alternatively configured such that the outer wall 352 encloses the bezel 194 of the mechanical switch 190 and the rear surface 360 of frame 350 abuts the outer surface 199 of the faceplate 196. In another example, the frame 350 may be alternatively configured such that the outer wall 352 encloses the faceplate 196 of the mechanical switch 190, for instance such that the rear surface 360 of frame 350 abuts a surface of a structure in which the mechanical switch 190 is installed, such as a surface of a wall.

As shown, the frame 350 may be configured such that one or more outer perimeter surfaces of the outer wall 352 protrude beyond corresponding outer perimeter surfaces of the bezel 194 of the mechanical switch 190. It should be appreciated that the outer wall 352 of the frame 350 is not limited to the illustrated geometry. For example, the frame 350 may be alternatively configured such that the outer perimeter surfaces of the outer wall 352 are flush with, or recessed relative to, corresponding outer perimeter surfaces of the bezel 194 of the mechanical switch 190. Such a configuration may allow the faceplate 196 of the mechanical switch 190 to be removed without detaching the frame 350 from the paddle actuator 192 of the mechanical switch 190.

The mounting tab 330 may be monolithic with the frame 350. For example, as shown the frame 350 may further include a cross member 362 that extends between the opposed side walls 358 of the outer wall 352 (e.g., from a first one of the side walls 358 to the other side wall 358). As shown, the mounting tab 330 may extend outward from the cross member 362 such that the attachment surface 332 of the mounting tab 330 is angularly offset relative to the rear surface 360 of the frame 350. The mounting tab 330 may define a fixed end 334 where the mounting tab 330 extends from the cross member 362, and a free end 336 that is spaced from the fixed end 334. In this regard, as shown the mounting tab 330 may extend outward from the fixed end 334, which may be supported by the frame 350, to the free end 336.

Figure 15:
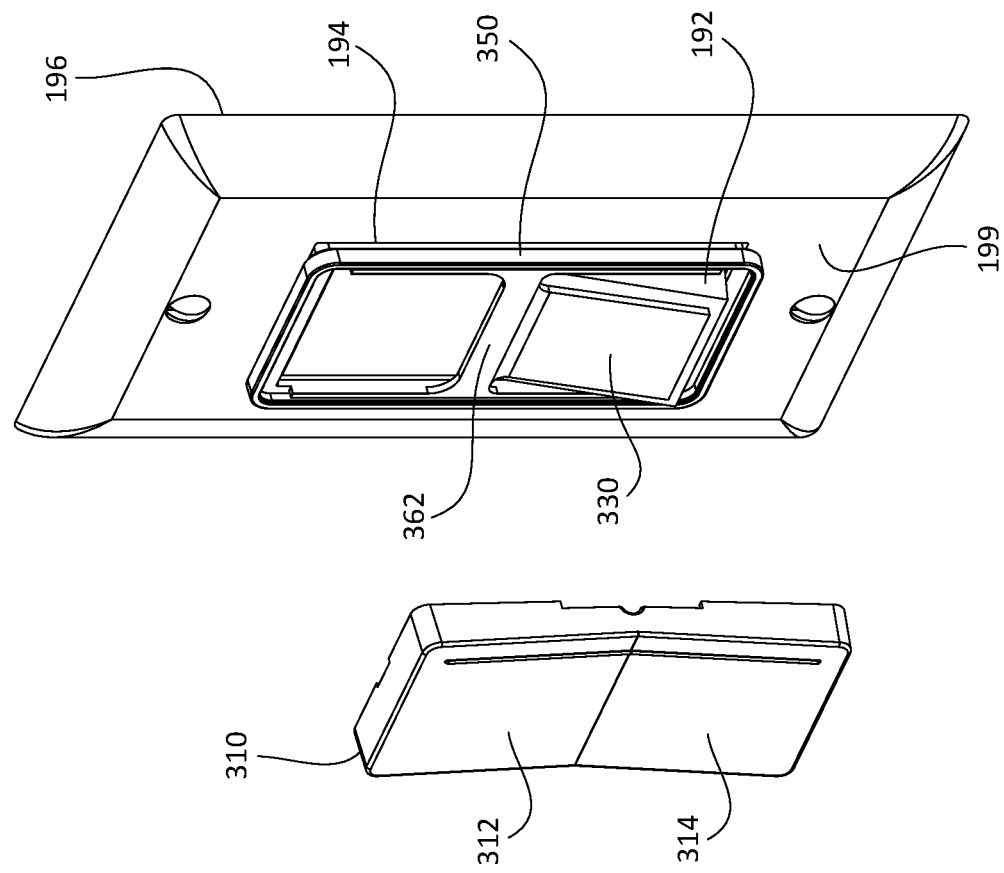
FIG. 15 is a perspective view of the example remote control device illustrated in FIG. 12, with the frame of the remote control device attached to a paddle actuator of the light switch and with a control unit component of the remote control device detached from the frame.
Figure 17:
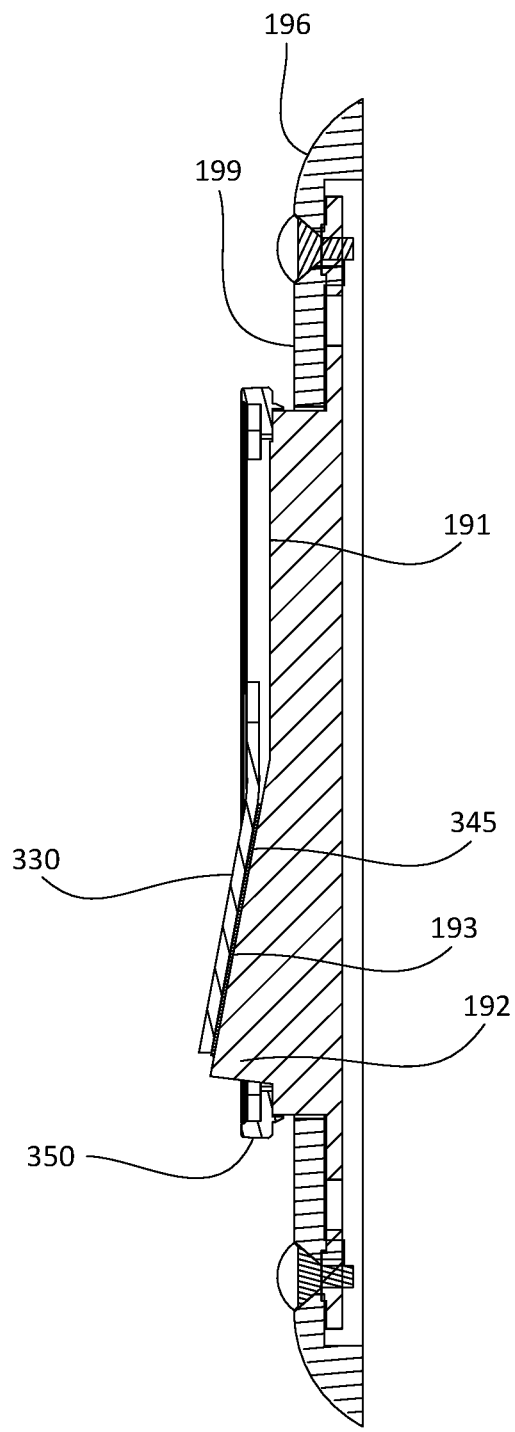
FIG. 17 is a side cross-section view of the example remote control device and light switch illustrated in FIG. 12.

The frame 350 may define an opening 364 that extends therethrough. The opening 364 may be configured to receive the protruding portion of the paddle actuator 192 therein. When the protruding portion of the paddle actuator 192 is received in the opening 364, the frame 350 may at least partially surround the paddle actuator 192 (e.g., as shown in FIG. 15). The frame 350 may be made of any suitable material, such as plastic.

The base 320 may be configured to facilitate alignment of the frame 350 relative to the mechanical switch 190, for instance during attachment of the base 320 to the paddle actuator 192 of the mechanical switch 190. For example, the base 320 may further include one or more alignment members that may be configured to be received in the gap 197 between the bezel 194 of the mechanical switch 190 and the opening 198 of the faceplate 196. As shown, the frame 350 may include a plurality of alignment ridges 366 that may extend outward from the rear surface 360 of the frame 350 such that the alignment ridges 366 may be received in the gap 197. The frame 350 may be configured such that the alignment ridges 366 engage with corresponding outer surfaces of the bezel 194 of the mechanical switch 190. It should be appreciated that the alignment ridges 366 are optional and may be omitted from an example implementation of the frame 350.

The mounting tab 330 and the frame 350 may be configured to, when the base 320 is attached to the paddle actuator 192 of the mechanical switch 190, cause the rear surface 360 of the frame 350 to be biased against a structure that surrounds the paddle actuator 192, such as the bezel 194 or the outer surface 199 of the faceplate 196. As shown (e.g., in FIG. 13), the mounting tab 330 may extend from the frame 350 at the fourth angle α4 relative to the rear surface 360 of the frame 350. For example, the attachment surface 332 may form the fourth angle α4 relative to the rear surface 360 of the frame 350. The fourth angle α4 may be smaller than the first angle α1 formed by the second actuation surface 193 of the protruding portion of the paddle actuator 192 relative to the bezel 194 of the mechanical switch 190 (e.g., as shown in FIG. 13).

When the mounting tab 330 is attached to the protruding portion of the paddle actuator 192 of the mechanical switch 190, the mounting tab 330 may deflect, for example may bend near or at the fixed end 334, due to the size difference between the fourth angle α4 and the first angle α1. This deflection of the mounting tab 330 may cause the cross member 362, and thus the frame 350, to be biased rearward, thereby causing the rear surface 360 of the frame 350 to be biased against the bezel 194 of the mechanical switch 190. This may ensure uniform spacing between the rear surface 360 of the frame 350 and the outer surface 199 of the faceplate 196.

The base 320 may be configured to enable releasable attachment of the control unit 310 to the base 320. For example, one or more components of the base 320 may include engagement features (not shown) that may be configured to engage with complementary engagement features (not shown) of the control unit 310. In this regard, the frame 350 may be configured for releasable attachment of the control unit 310 to the frame 350.

The control unit 310 may be configured to function similarly to the control unit 110. For example, the control unit 310 may define a control interface that is configured to receive inputs, such as finger presses and/or gestures, from a user of the remote control device 300. For example, in accordance with the illustrated configuration, the control unit 310 may be configured to pivot about a central axis, when attached to the base 320, in response to actuations of respective upper and lower portions 312, 314 of the control unit 310. The control unit 310 may further define a capacitive touch surface along the upper and lower portions 312, 314, that may be configured to detect touches along an x axis, a y axis, or both an x and y axis.

The control unit 310 may be battery-powered. The frame 350 may be configured to receive a battery (not shown) for powering the control unit 310. The base 320 may be configured to provide power from the battery to the control unit 310 when the control unit 310 is attached to the base 320. For example, the base 320 may include a battery PCB (not shown) that may be mounted to the frame 350, and that may operate similarly to the battery PCB 180 of the base 120 of the remote control device 100 to transfer power from the base 320 to the control unit 310.

The control unit 310 may be configured such that power may be transferred from the battery to the control unit 310 via the battery PCB of the base 320. For example, the control unit 310 may include a control PCB (not shown) that may be configured similarly to the control PCB 175 of the control unit 110. In this regard, the battery PCB of the base 320 may be configured to, when the control unit 310 is attached to the frame 350, electrically couple the control unit 310 to the battery. Alternatively, the control unit 310 may be configured to derive power from a power source connected to the mechanical switch 190, such as the source of AC power for example. Alternatively still, the control unit 310 may be configured to house the battery.

In an example process of attaching the base 320 to the paddle actuator 192 of the mechanical switch 190, the frame 350 may be aligned with the bezel 194 of the mechanical switch 190 such that the alignment ridges 366, if present, are received in the gap 197. The mounting tab 330 may then be adhered to the protruding portion of the paddle actuator 192 (e.g., the second actuation surface 193 when the paddle actuator 192 is in the first position as shown) with the sheet 345 of double-sided adhesive. As the mounting tab 330 is adhered to the protruding portion of the paddle actuator 192, the rear surface 360 of the frame 350 may be biased against the bezel 194 of the mechanical switch 190. With the base 320 attached to the paddle actuator 192 (e.g., as shown in FIG. 15), the control unit 310 may be attached to the base 320.

FIGS. 18-22 depict another base 420 that may be implemented in the remote control device 300, for example in the place of the base 320. The base 420 may be attached to the paddle actuator 192 of the mechanical switch 190 without removing the faceplate 196. In this regard, the remote control device 300 may be mounted over an installed mechanical switch, such as the mechanical switch 190, without performing any electrical re-wiring of the mechanical switch.

Figure 18:
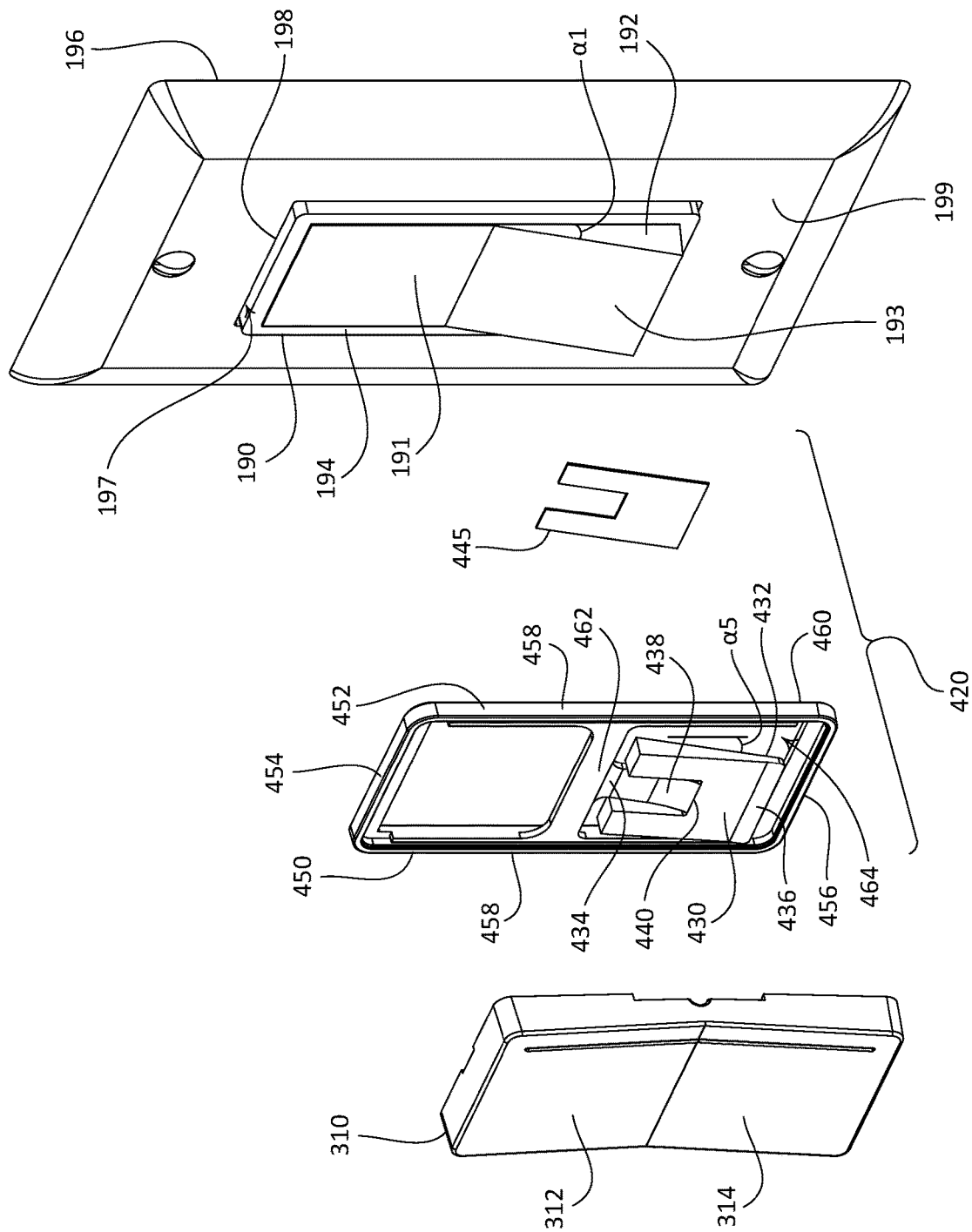
FIG. 18 is an exploded view of the example remote control device illustrated in FIG. 12, including another example configuration of the frame of the remote control device, before the remote control device is mounted to the light switch.
Figure 19A:
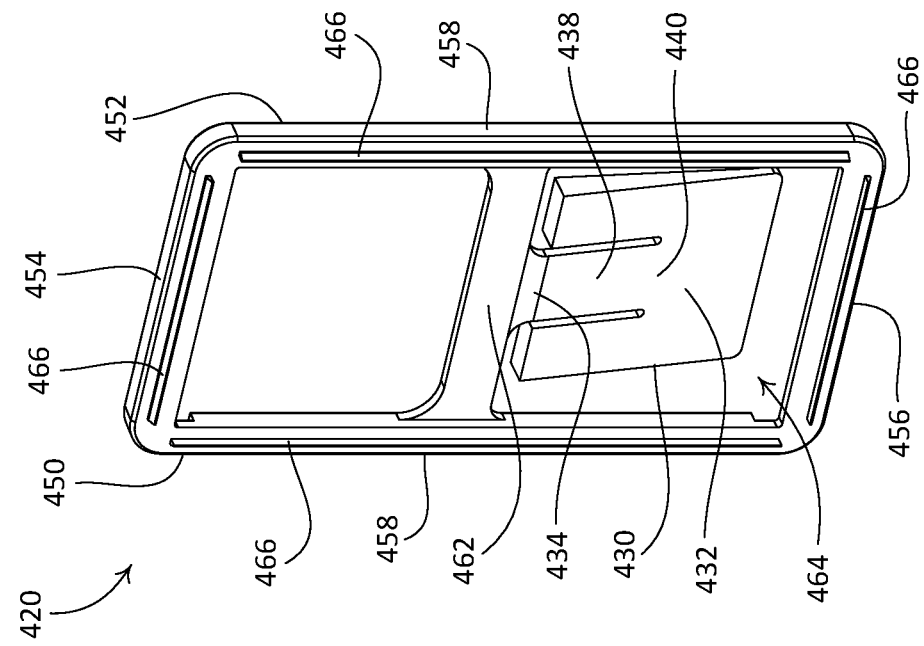
FIG. 19A is a front view of the frame illustrated in FIG. 18.
Figure 19B:
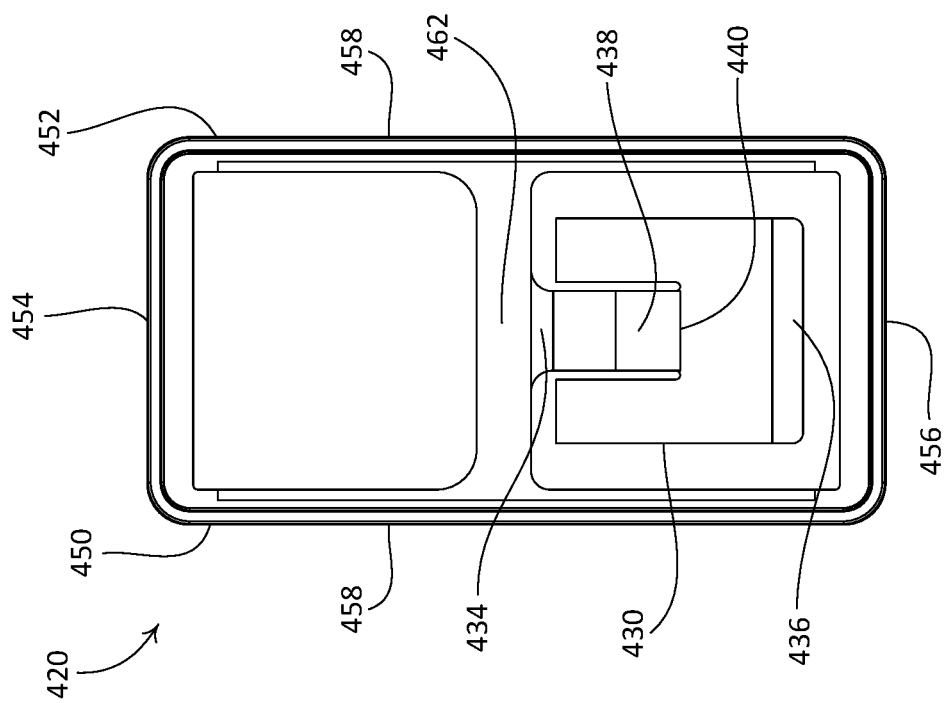
FIG. 19B is a rear perspective view of the frame illustrated in FIG. 18.
Figure 21:
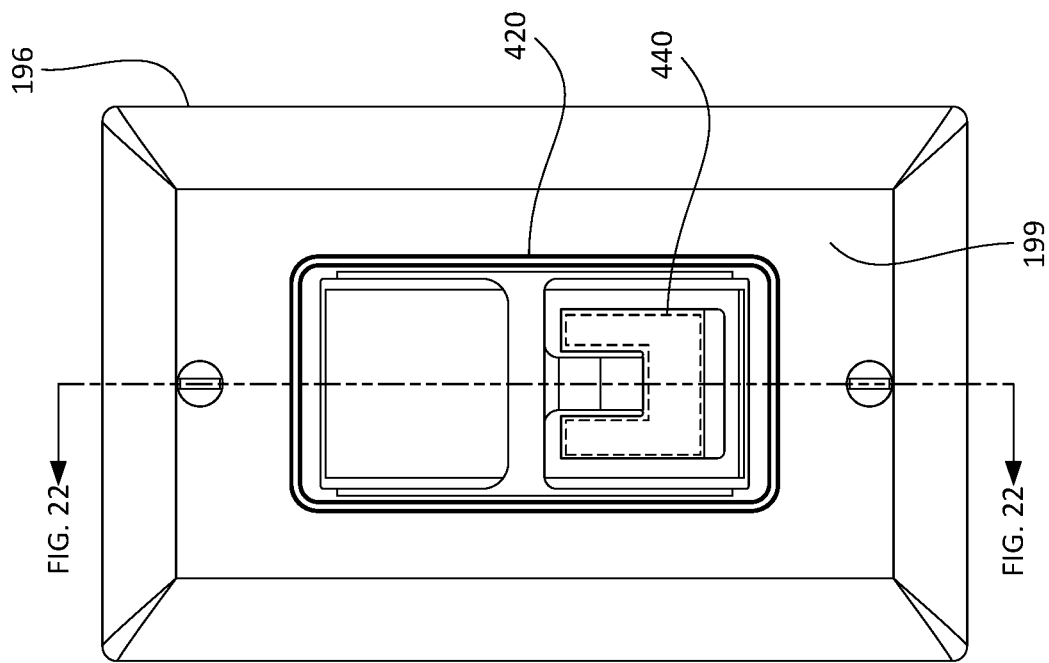
FIG. 21 is a front view of the example remote control device and light switch illustrated in FIG. 18.

As shown, the base 420 may include a mounting tab 430 and a frame 450. The mounting tab 430 may be configured to be attached to the protruding portion of the paddle actuator 192 of the mechanical switch 190. For example, as shown the mounting tab 430 may define an attachment surface 432 that is configured to be adhered to the protruding portion of the paddle actuator 192. The attachment surface 432 may be adhered, for example, using double-sided adhesive such as the illustrated sheet 445 of double-sided adhesive as shown in FIG. 18. The mounting tab 430 may be made of any suitable material, such as plastic. It should be appreciated that attachment of the mounting tab 430 to the paddle actuator 192 is not limited to double-sided adhesive, and that the mounting tab 430 may be alternatively configured to otherwise attach to the protruding portion of the paddle actuator 192, for example mechanically (e.g., using one or more fasteners).

As shown, the frame 450 may include an outer wall 452 that extends along a perimeter of the frame 450. The outer wall 452 may alternatively be referred to as a perimeter wall of the frame 450. The outer wall 452 may include a first end wall 454, an opposed second end wall 456, and opposed side walls 458 that extend from respective ends of the first end wall 454 to corresponding ends of the second end wall 456. In accordance with the illustrated orientation of the frame 450, the first end wall 454 may be referred to as an upper end wall of the frame 450 and the second end wall 456 may be referred to as a lower end wall of the frame 450. The outer wall 452 may define a rear surface 460 of the frame 450.

In accordance with the illustrated configuration of the frame 450, the frame 450 may be configured such that the outer wall 452 (e.g., at least a portion of the rear surface 460 of the frame 450) abuts the bezel 194 when the base 420 is attached to the protruding portion of the paddle actuator 192. It should be appreciated that the outer wall 452 of the frame 450 is not limited to the illustrated geometry. For example, the frame 450 may be alternatively configured such that the outer wall 452 encloses the bezel 194 of the mechanical switch 190 and the rear surface 460 of frame 450 abuts the outer surface 199 of the faceplate 196. In another example, the frame 450 may be alternatively configured such that the outer wall 452 encloses the faceplate 196 of the mechanical switch 190, for instance such that the rear surface 460 of frame 450 abuts a surface of a structure in which the mechanical switch 190 is installed, such as a surface of a wall.

As shown, the frame 450 may be configured such that one or more outer perimeter surfaces of the outer wall 452 protrude beyond corresponding outer perimeter surfaces of the bezel 194 of the mechanical switch 190. It should be appreciated that the outer wall 452 of the frame 450 is not limited to the illustrated geometry. For example, the frame 450 may be alternatively configured such that the outer perimeter surfaces of the outer wall 452 are flush with, or recessed relative to, corresponding outer perimeter surfaces of the bezel 194 of the mechanical switch 190. Such a configuration may allow the faceplate 196 of the mechanical switch 190 to be removed without detaching the frame 450 from the paddle actuator 192 of the mechanical switch 190.

The mounting tab 430 may be monolithic with the frame 450. For example, as shown the frame 450 may further include a cross member 462 that extends between the opposed side walls 458 of the outer wall 452 (e.g., from a first one of the side walls 458 to the other side wall 458). As shown, the mounting tab 430 may extend outward from the cross member 462 such that the attachment surface 432 of the mounting tab 430 is angularly offset relative to the rear surface 460 of the frame 450. The mounting tab 430 may define a fixed end 434 where the mounting tab 430 extends from the cross member 462, and a free end 436 that is spaced from the fixed end 434. In this regard, as shown the mounting tab 430 may extend outward from the fixed end 434, which may be supported by the frame 450, to the free end 436.

The mounting tab 430 may have a wedge-shaped body that tapers with increasing distance from the fixed end 434. As shown, the body of the mounting tab 430 may be configured to maximize thickness of the mounting tab 430 along a direction that extends perpendicular to the outer surface 199 of the faceplate 196. This configuration may in turn maximize stiffness of the mounting tab 430 while maintaining clearance for the mounting of a control unit (e.g., the control unit 310) to the base 420. The mounting tab 430 may be configured to reduce the effects of peel loading that may, for example, potentially cause the double-sided adhesive to peel away from the second actuation surface 193 of the paddle actuator 192 over time. The body of the mounting tab 430 may define an arm 438 that extends from the fixed end 434 to an intermediate joint 440, such that the mounting tab 430 defines a U-shaped attachment surface 432. As shown, the arm 438 may be centered between opposed sides of the mounting tab 430, and may have a length such that the intermediate joint 440 is spaced approximately equidistantly from opposed upper and lower edges of the mounting tab 430.

Figure 20:
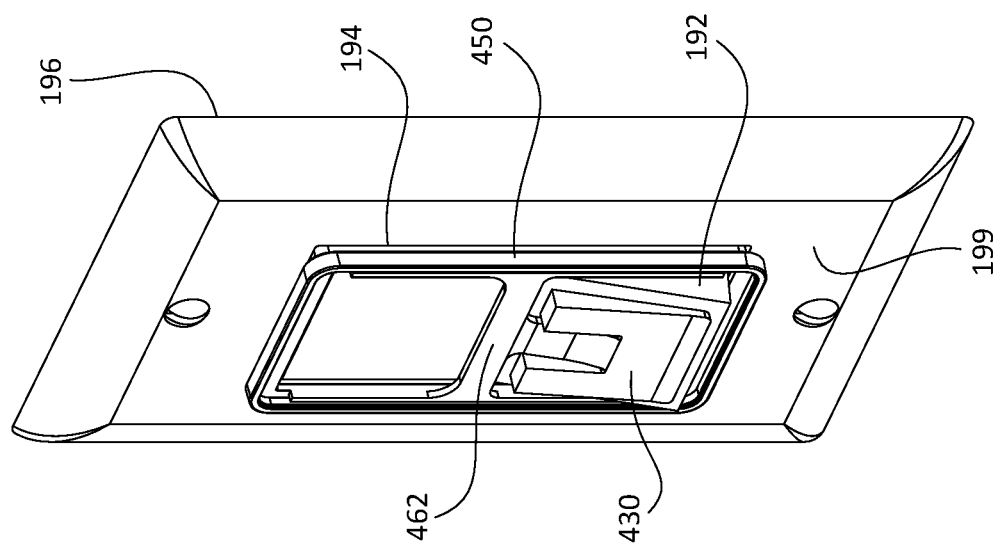
FIG. 20 is a perspective view of the example remote control device illustrated in FIG. 18, with the frame of the remote control device attached to a paddle actuator of the light switch and with a control unit component of the remote control device detached from the frame.
Figure 20:
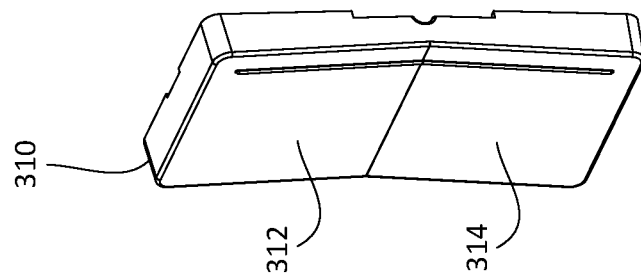
Figure 22:
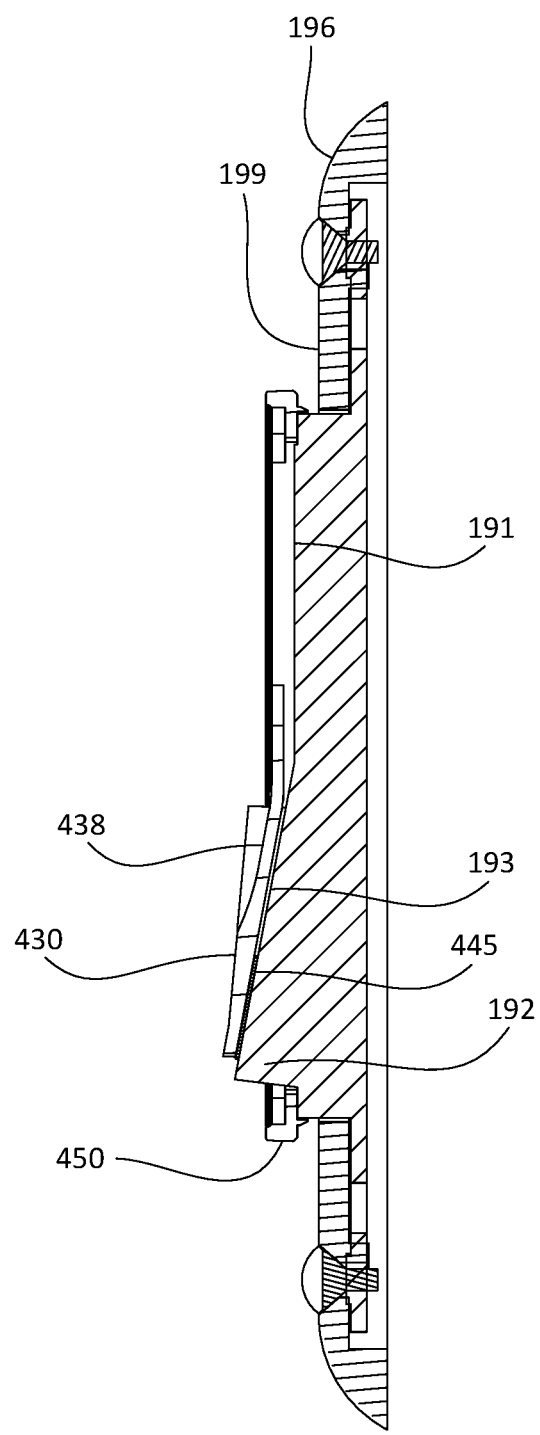
FIG. 22 is a side cross-section view of the example remote control device and light switch illustrated in FIG. 18.

The frame 450 may define an opening 464 that extends therethrough. The opening 464 may be configured to receive the protruding portion of the paddle actuator 192 therein. When the protruding portion of the paddle actuator 192 is received in the opening 464, the frame 450 may at least partially surround the paddle actuator 192 (e.g., as shown in FIG. 20). The frame 450 may be made of any suitable material, such as plastic.

The base 420 may be configured to facilitate alignment of the frame 450 relative to the mechanical switch 190, for instance during attachment of the base 420 to the paddle actuator 192 of the mechanical switch 190. For example, the base 420 may further include one or more alignment members that may be configured to be received in the gap 197 between the bezel 194 of the mechanical switch 190 and the opening 198 of the faceplate 196. As shown, the frame 450 may include a plurality of alignment ridges 466 that may extend outward from the rear surface 460 of the frame 450 such that the alignment ridges 466 may be received in the gap 197. The frame 450 may be configured such that the alignment ridges 466 engage with corresponding outer surfaces of the bezel 194 of the mechanical switch 190. It should be appreciated that the alignment ridges 466 are optional and may be omitted from an example implementation of the frame 450.

The mounting tab 430 and the frame 450 may be configured to, when the base 420 is attached to the paddle actuator 192 of the mechanical switch 190, cause the rear surface 460 of the frame 450 to be biased against a structure that surrounds the paddle actuator 192, such as the bezel 194 or the outer surface 199 of the faceplate 196. As shown (e.g., in FIG. 18), the mounting tab 430 may extend from the frame 450 at a fifth angle α5 relative to the rear surface 460 of the frame 450. The fifth angle α5 may be smaller than the first angle α1 formed by the second actuation surface 193 of the protruding portion of the paddle actuator 192 relative to the bezel 194 of the mechanical switch 190 (e.g., as shown in FIG. 18).

When the mounting tab 430 is attached to the protruding portion of the paddle actuator 192 of the mechanical switch 190, one or more portions of the mounting tab 430 may deflect, for example may bend near or at the fixed end 434 and/or near or at the intermediate joint 440, due to the size difference between the fifth angle α4 and the first angle α1. This deflection of the mounting tab 430 may cause the cross member 462, and thus the frame 450, to be biased rearward, thereby causing the rear surface 460 of the frame 450 to be biased against the bezel 194 of the mechanical switch 190. This may ensure uniform spacing between the rear surface 460 of the frame 450 and the outer surface 199 of the faceplate 196.

The base 420 may be configured to enable releasable attachment of the control unit 310 to the base 420. For example, one or more components of the base 420 may include engagement features (not shown) that may be configured to engage with complementary engagement features (not shown) of the control unit 310. In this regard, the frame 450 may be configured for releasable attachment of the control unit 310 to the frame 450.

The frame 450 may be configured to receive a battery (not shown) for powering the control unit 310. The base 420 may be configured to provide power from the battery to the control unit 310 when the control unit 310 is attached to the base 420. For example, the base 420 may include a battery PCB (not shown) that may be mounted to the frame 450, and that may operate similarly to the battery PCB 180 of the base 120 of the remote control device 100 to transfer power from the base 420 to the control unit 310. The battery PCB of the base 420 may be configured to, when the control unit 310 is attached to the frame 450, electrically couple the control unit 310 to the battery.

In an example process of attaching the base 420 to the paddle actuator 192 of the mechanical switch 190, the frame 450 may be aligned with the bezel 194 of the mechanical switch 190 such that the alignment ridges 466, if present, are received in the gap 197. The mounting tab 430 may then be adhered to the protruding portion of the paddle actuator 192 (e.g., the second actuation surface 193 when the paddle actuator 192 is in the first position as shown) with the sheet 445 of double-sided adhesive. As the mounting tab 430 is adhered to the protruding portion of the paddle actuator 192, the rear surface 460 of the frame 450 may be biased against the bezel 194 of the mechanical switch 190. With the base 420 attached to the paddle actuator 192 (e.g., as shown in FIG. 20), the control unit 310 may be attached to the base 420.

FIGS. 23-27 depict another base 520 that may be implemented in the remote control device 300, for example in the place of the base 320. The base 520 may be attached to the paddle actuator 192 of the mechanical switch 190 without removing the faceplate 196. In this regard, the remote control device 300 may be mounted over an installed mechanical switch, such as the mechanical switch 190, without performing any electrical re-wiring of the mechanical switch.

Figure 23:
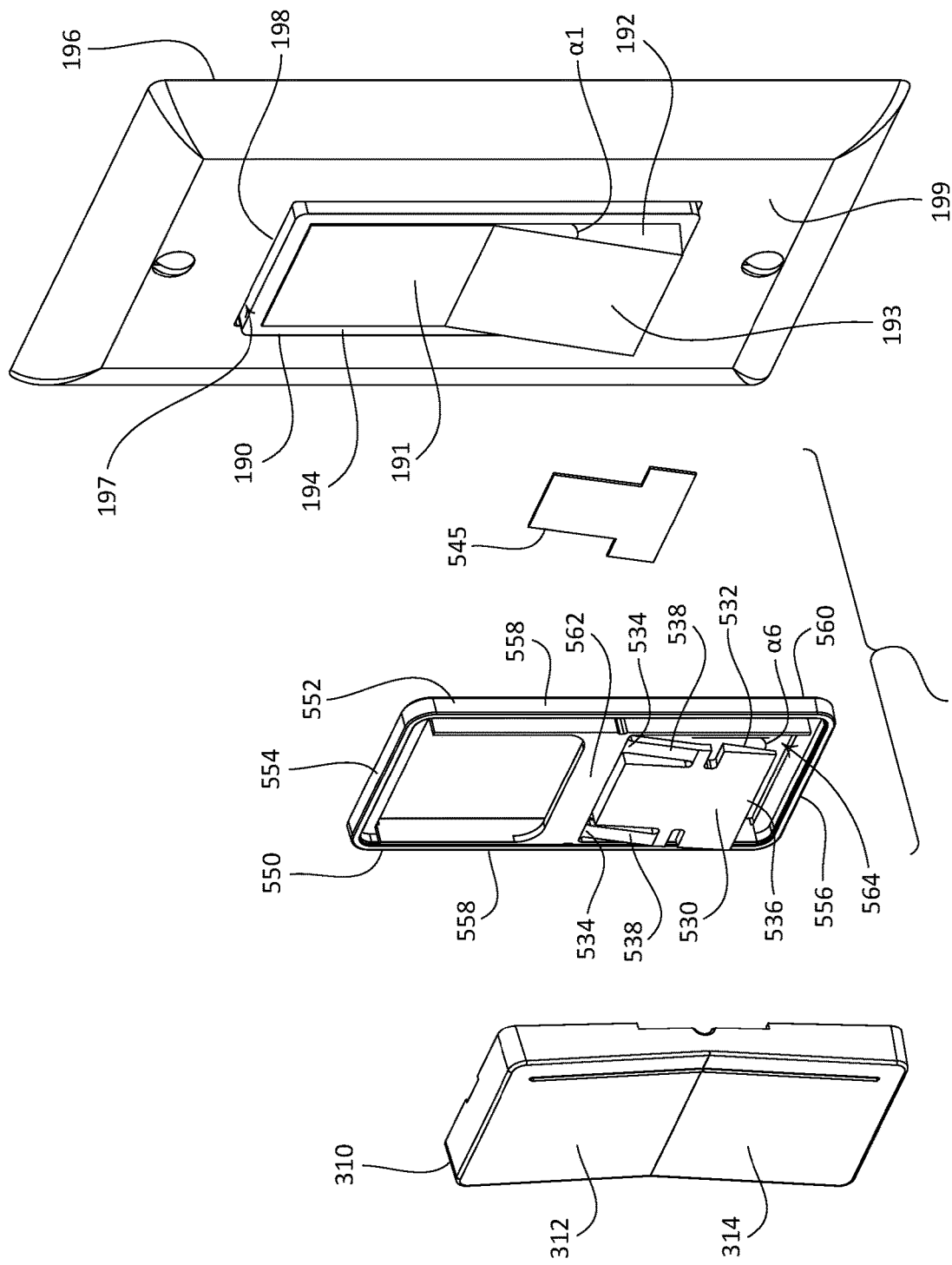
FIG. 23 is an exploded view of the example remote control device illustrated in FIG. 12, including another example configuration of the frame of the remote control device, before the remote control device is mounted to the light switch.
Figures 24A, 24B:
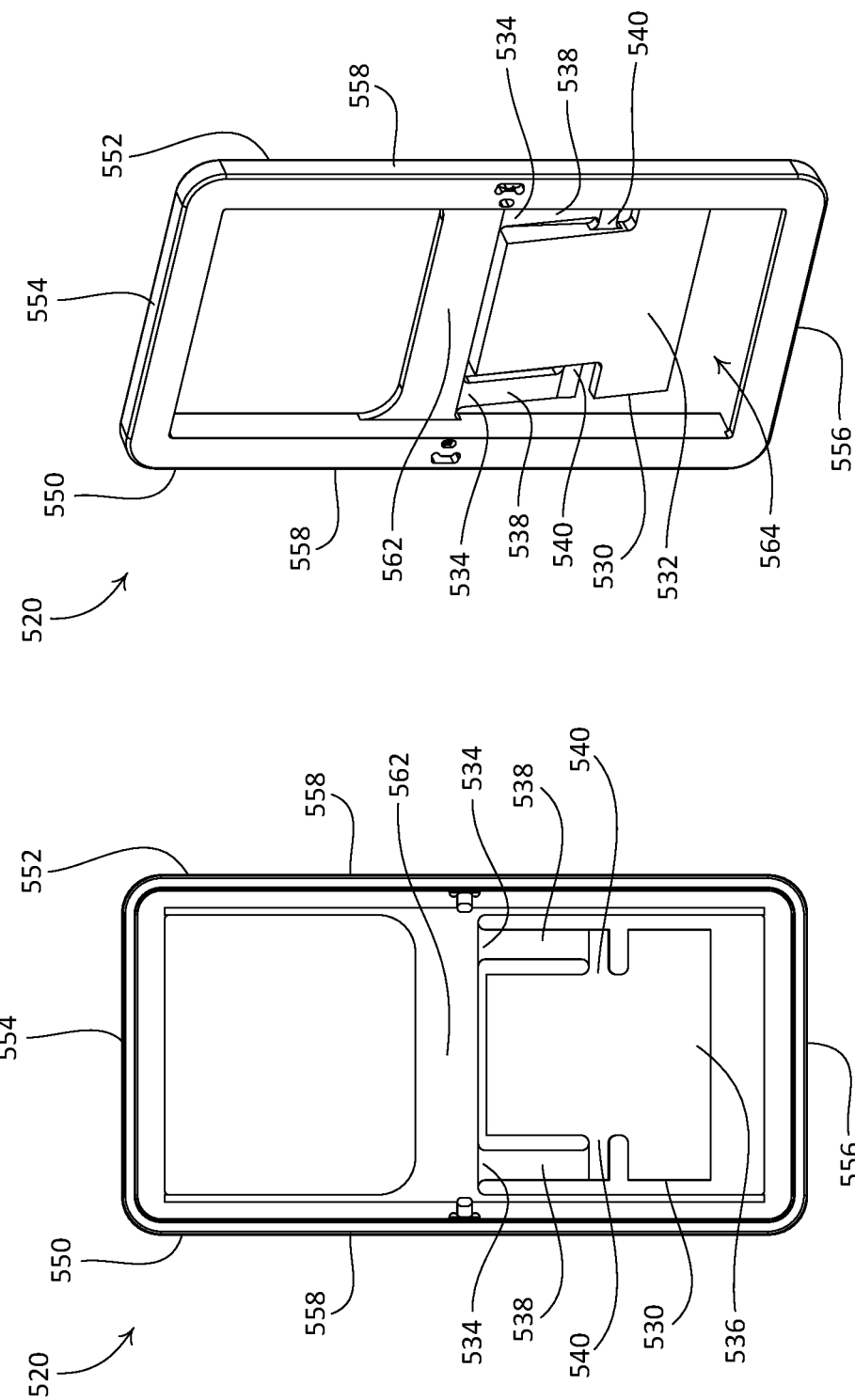
FIG. 24A is a front view of the frame illustrated in FIG. 23.
FIG. 24B is a rear perspective view of the frame illustrated in FIG. 23.
Figure 26:
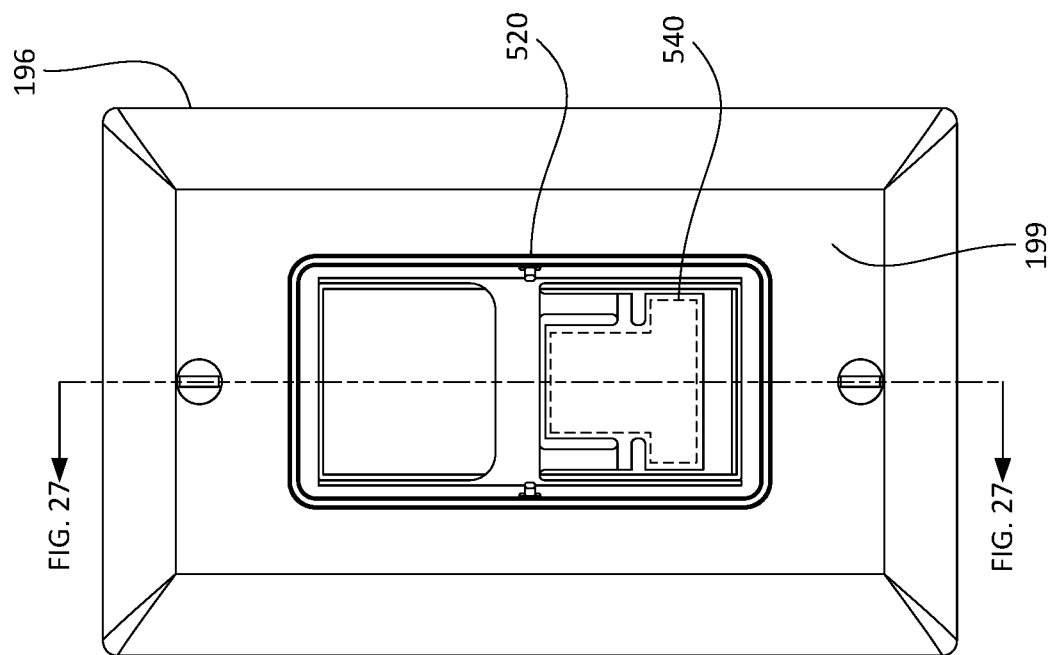
FIG. 26 is a front view of the example remote control device and light switch illustrated in FIG. 23.

As shown, the base 520 may include a mounting tab 530 and a frame 550. The mounting tab 530 may be configured to be attached to the protruding portion of the paddle actuator 192 of the mechanical switch 190. For example, as shown the mounting tab 530 may define an attachment surface 532 that is configured to be adhered to the protruding portion of the paddle actuator 192. The attachment surface 532 may be adhered, for example, using double-sided adhesive such as the illustrated sheet 545 of double-sided adhesive as shown in FIG. 23. The mounting tab 530 may be made of any suitable material, such as plastic. It should be appreciated that attachment of the mounting tab 530 to the paddle actuator 192 is not limited to double-sided adhesive, and that the mounting tab 530 may be alternatively configured to otherwise attach to the protruding portion of the paddle actuator 192, for example mechanically (e.g., using one or more fasteners).

As shown, the frame 550 may include an outer wall 552 that extends along a perimeter of the frame 550. The outer wall 552 may alternatively be referred to as a perimeter wall of the frame 550. The outer wall 552 may include a first end wall 554, an opposed second end wall 556, and opposed side walls 558 that extend from respective ends of the first end wall 554 to corresponding ends of the second end wall 556. In accordance with the illustrated orientation of the frame 550, the first end wall 554 may be referred to as an upper end wall of the frame 550 and the second end wall 556 may be referred to as a lower end wall of the frame 550. The outer wall 552 may define a rear surface 560 of the frame 550.

In accordance with the illustrated configuration of the frame 550, the frame 550 may be configured such that the outer wall 552 (e.g., at least a portion of the rear surface 560 of the frame 550) abuts the bezel 194 when the base 520 is attached to the protruding portion of the paddle actuator 192. It should be appreciated that the outer wall 552 of the frame 550 is not limited to the illustrated geometry. For example, the frame 550 may be alternatively configured such that the outer wall 552 encloses the bezel 194 of the mechanical switch 190 and the rear surface 560 of frame 550 abuts the outer surface 199 of the faceplate 196. In another example, the frame 550 may be alternatively configured such that the outer wall 552 encloses the faceplate 196 of the mechanical switch 190, for instance such that the rear surface 560 of frame 550 abuts a surface of a structure in which the mechanical switch 190 is installed, such as a surface of a wall.

As shown, the frame 550 may be configured such that one or more outer perimeter surfaces of the outer wall 552 protrude beyond corresponding outer perimeter surfaces of the bezel 194 of the mechanical switch 190. It should be appreciated that the outer wall 552 of the frame 550 is not limited to the illustrated geometry. For example, the frame 550 may be alternatively configured such that the outer perimeter surfaces of the outer wall 552 are flush with, or recessed relative to, corresponding outer perimeter surfaces of the bezel 194 of the mechanical switch 190. Such a configuration may allow the faceplate 196 of the mechanical switch 190 to be removed without detaching the frame 550 from the paddle actuator 192 of the mechanical switch 190.

The mounting tab 530 may be monolithic with the frame 550. For example, as shown the frame 550 may further include a cross member 562 that extends between the opposed side walls 558 of the outer wall 552 (e.g., from a first one of the side walls 558 to the other side wall 558). As shown, the mounting tab 530 may extend outward from the cross member 562 such that the attachment surface 532 of the mounting tab 530 is angularly offset relative to the rear surface 560 of the frame 550. The mounting tab 530 may define a fixed end 534 where the mounting tab 530 extends from the cross member 562, and a free end 536 that is spaced from the fixed end 534. In this regard, as shown the mounting tab 530 may extend outward from the fixed end 534, which may be supported by the frame 550, to the free end 536.

The mounting tab 530 may have a wedge-shaped body that tapers with increasing distance from the fixed end 534. As shown, the body of the mounting tab 530 may be configured to maximize thickness of the mounting tab 530 along a direction that extends perpendicular to the outer surface 199 of the faceplate 196. This configuration may in turn maximize stiffness of the mounting tab 530 while maintaining clearance for the mounting of a control unit (e.g., the control unit 310) to the base 520. The mounting tab 530 may be configured to reduce the effects of peel loading that may, for example, potentially cause the double-sided adhesive to peel away from the second actuation surface 193 of the paddle actuator 192 over time. The body of the mounting tab 530 may define a pair of arms 538 that extend from the fixed end 434 to respective intermediate joints 540, such that the mounting tab 530 defines a T-shaped attachment surface 532. As shown, the arms 538 may be spaced apart from each other, for example at opposed sides of the mounting tab 530, and may have respective lengths such that the intermediate joints 540 are spaced approximately equidistantly from opposed upper and lower edges of the mounting tab 530. This configuration of the arms 538 may enhance lateral stability of the base 520, for example by minimizing movement of the frame 550 (e.g., along directions parallel to the rear surface 560 of the frame 550) when the base 520 is attached to the protruding portion of the paddle actuator 192, while maximizing available surface area for the sheet 545 of double-sided adhesive.

Figure 25:
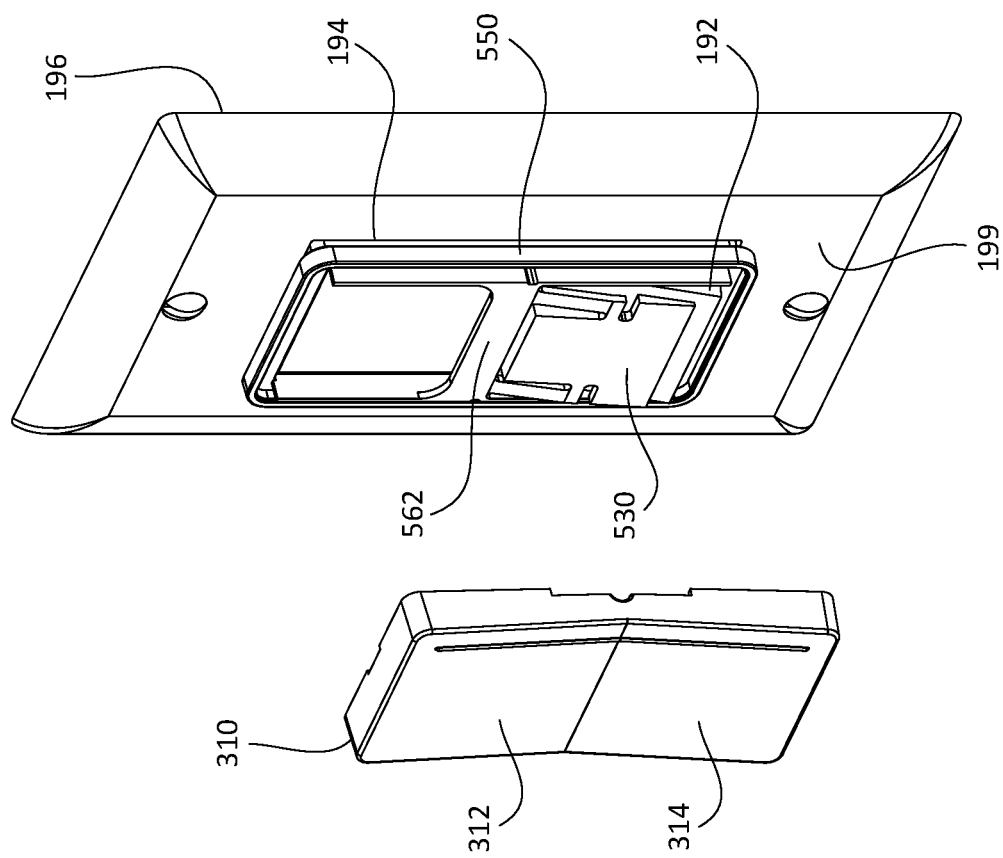
FIG. 25 is a perspective view of the example remote control device illustrated in FIG. 23, with the frame of the remote control device attached to a paddle actuator of the light switch and with a control unit component of the remote control device detached from the frame.
Figure 25:
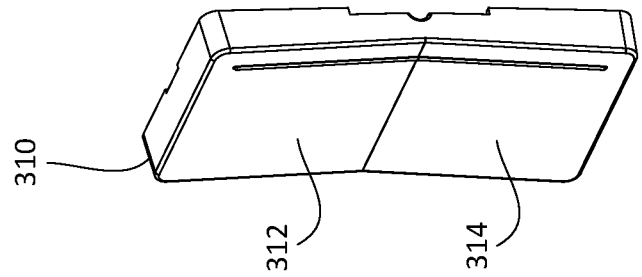
Figure 27:
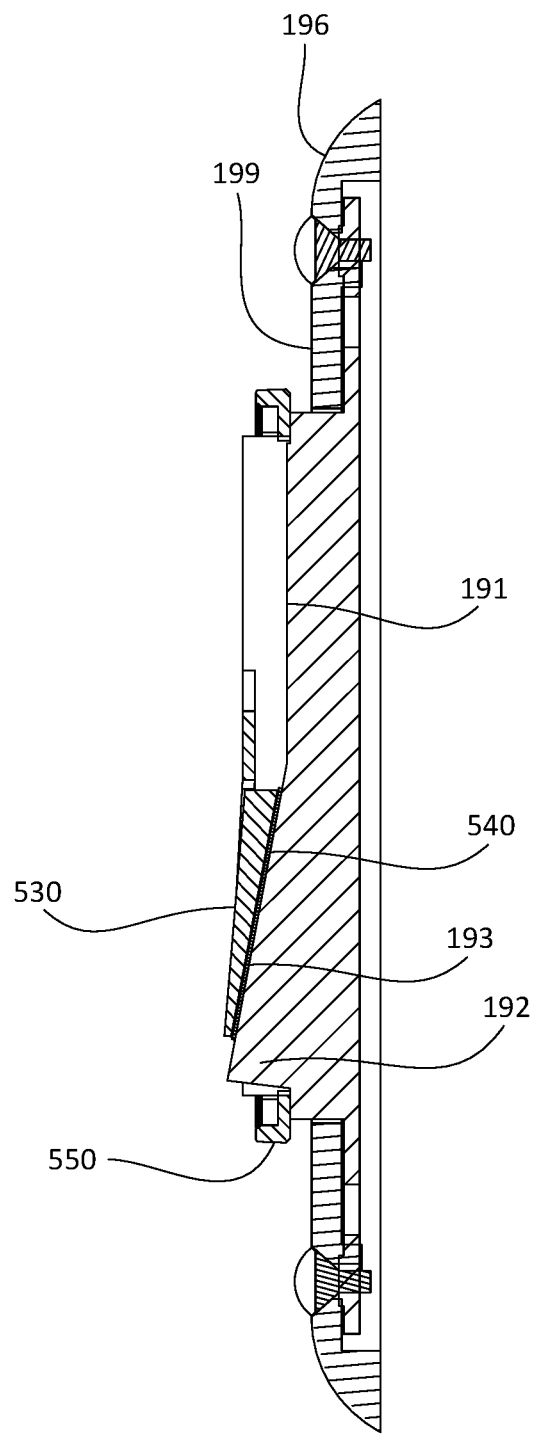
FIG. 27 is a side cross-section view of the example remote control device and light switch illustrated in FIG. 23.
Figure 28:
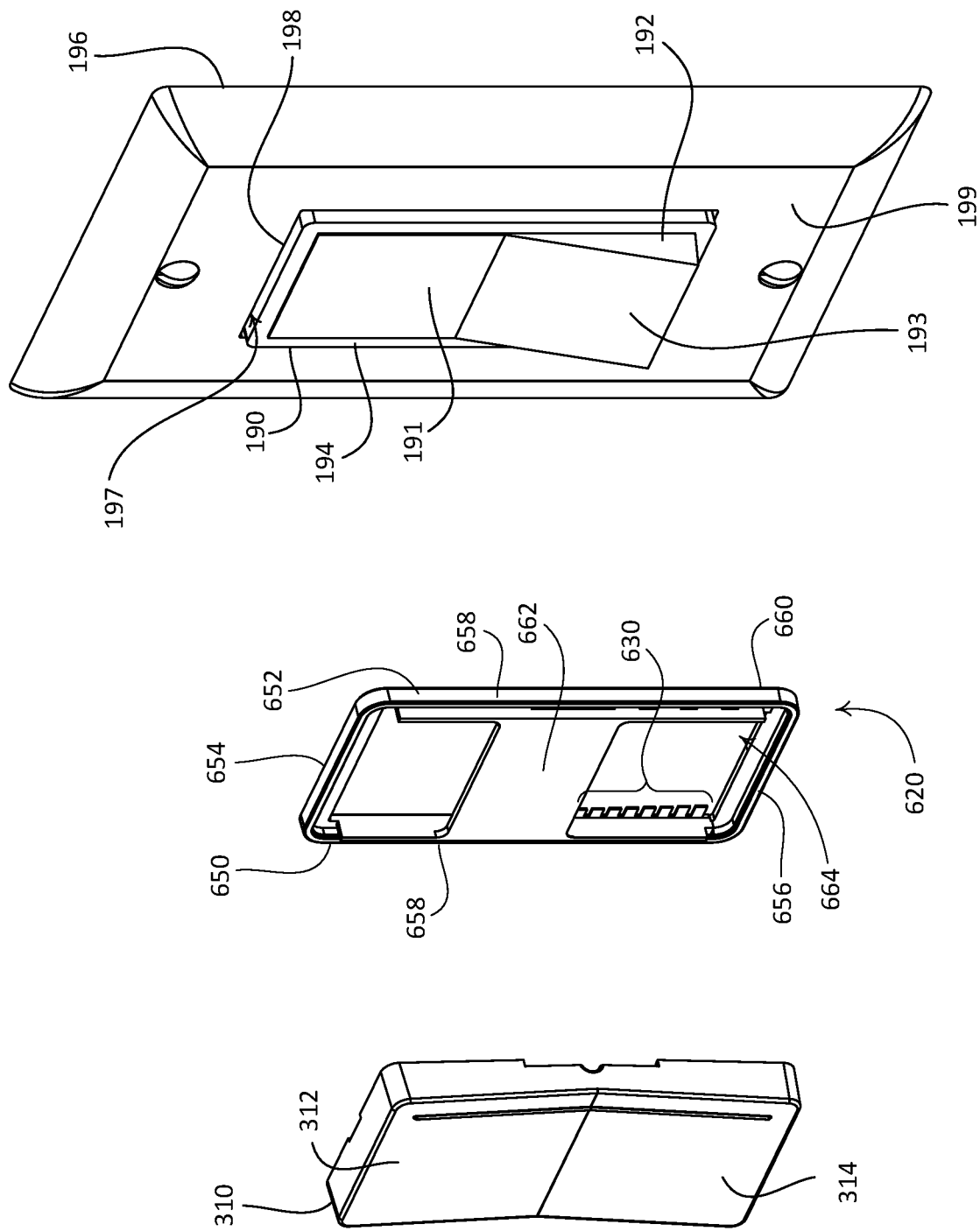
FIG. 28 is an exploded view of the example remote control device illustrated in FIG. 12, including another example configuration of the base of the remote control device, before the remote control device is mounted to the light switch.
Figure 29:
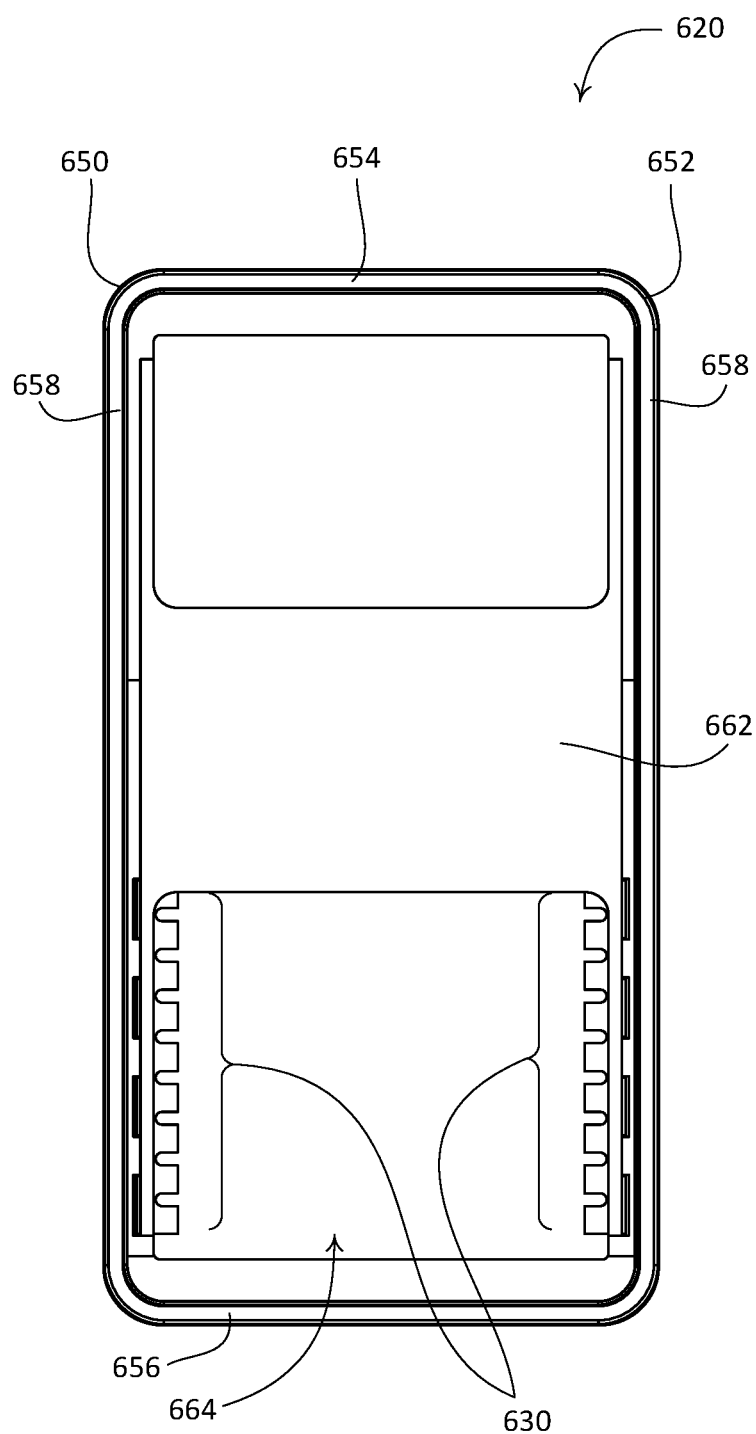
FIG. 29 is a front view of the base illustrated in FIG. 28.
Figure 31:
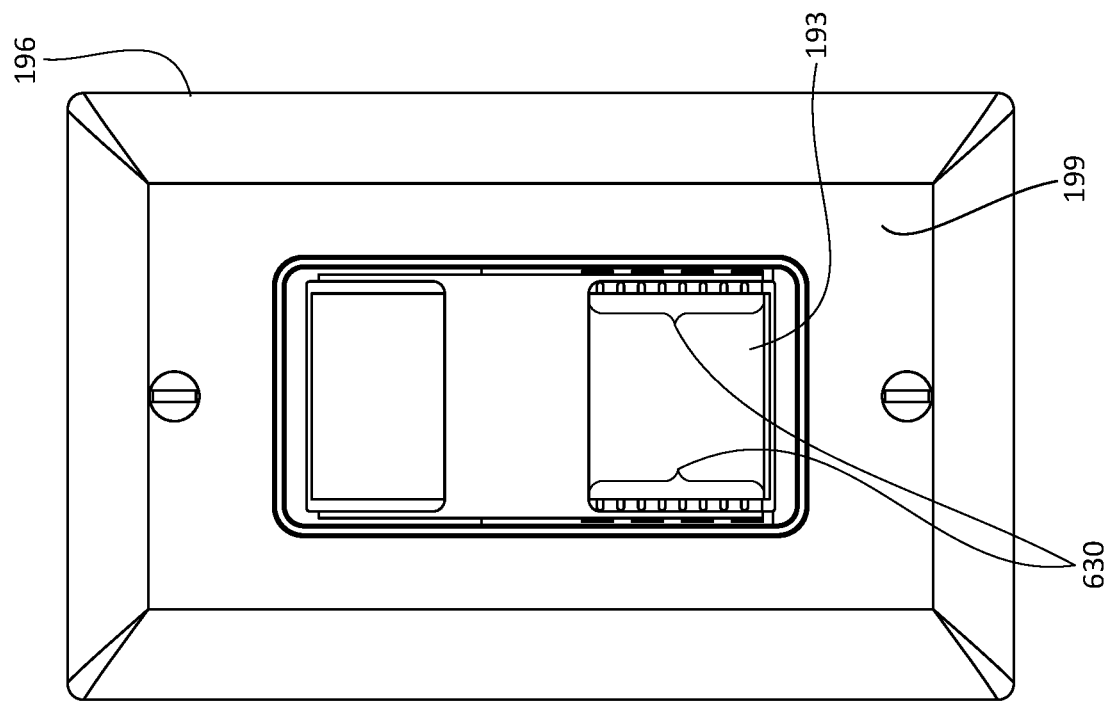
FIG. 31 is a front view of the example remote control device and light switch illustrated in FIG. 28.

The frame 550 may define an opening 564 that extends therethrough. The opening 564 may be configured to receive the protruding portion of the paddle actuator 192 therein. When the protruding portion of the paddle actuator 192 is received in the opening 564, the frame 550 may at least partially surround the paddle actuator 192 (e.g., as shown in FIG. 25). The frame 550 may be made of any suitable material, such as plastic.

The base 520 may be configured to facilitate alignment of the frame 550 relative to the mechanical switch 190, for instance during attachment of the base 520 to the paddle actuator 192 of the mechanical switch 190. For example, the base 520 may further include one or more alignment members (not shown) that may be configured to be received in the gap 197 between the bezel 194 of the mechanical switch 190 and the opening 198 of the faceplate 196.

The mounting tab 530 and the frame 550 may be configured to, when the base 520 is attached to the paddle actuator 192 of the mechanical switch 190, cause the rear surface 560 of the frame 550 to be biased against a structure that surrounds the paddle actuator 192, such as the bezel 194 or the outer surface 199 of the faceplate 196. As shown (e.g., in FIG. 23), the mounting tab 530 may extend from the frame 550 at a sixth angle $\alpha 6$ relative to the rear surface 560 of the frame 550. The sixth angle $\alpha 6$ may be smaller than the first angle $\alpha 1$ formed by the second actuation surface 193 of the protruding portion of the paddle actuator 192 relative to the bezel 194 of the mechanical switch 190 (e.g., as shown in FIG. 23).

When the mounting tab 530 is attached to the protruding portion of the paddle actuator 192 of the mechanical switch 190, one or more portions of the mounting tab 530 may deflect, for example may bend near or at the fixed end 534 and/or near or at the intermediate joints 540, due to the size difference between the fifth angle $\alpha 4$ and the first angle $\alpha 1$. This deflection of the mounting tab 530 may cause the cross member 562, and thus the frame 550, to be biased rearward, thereby causing the rear surface 560 of the frame 550 to be biased against the bezel 194 of the mechanical switch 190. This may ensure uniform spacing between the rear surface 560 of the frame 550 and the outer surface 199 of the faceplate 196.

The base 520 may be configured to enable releasable attachment of the control unit 310 to the base 520. For example, one or more components of the base 520 may include engagement features (not shown) that may be configured to engage with complementary engagement features (not shown) of the control unit 310. In this regard, the frame 550 may be configured for releasable attachment of the control unit 310 to the frame 550.

The frame 550 may be configured to receive a battery (not shown) for powering the control unit 310. The base 520 may be configured to provide power from the battery to the control unit 310 when the control unit 310 is attached to the base 520. For example, the base 520 may include a battery PCB (not shown) that may be mounted to the frame 550, and that may operate similarly to the battery PCB 180 of the base 120 of the remote control device 100 to transfer power from the base 520 to the control unit 310. The battery PCB of the base 520 may be configured to, when the control unit 310 is attached to the frame 550, electrically couple the control unit 310 to the battery.

In an example process of attaching the base 520 to the paddle actuator 192 of the mechanical switch 190, the frame 550 may be aligned with the bezel 194 of the mechanical switch 190, for example such that alignment features of the frame 550 are received in the gap 197. The mounting tab 530 may then be adhered to the protruding portion of the paddle actuator 192 (e.g., the second actuation surface 193 when the paddle actuator 192 is in the first position as shown) with the sheet 545 of double-sided adhesive. As the mounting tab 530 is adhered to the protruding portion of the paddle actuator 192, the rear surface 560 of the frame 550 may be biased against the bezel 194 of the mechanical switch 190. With the base 520 attached to the paddle actuator 192 (e.g., as shown in FIG. 25), the control unit 310 may be attached to the base 520.

FIGS. 28-31 depict another base 620 that may be implemented in the remote control device 300, for example, in the place of the base 320. The base 620 may be attached to the paddle actuator 192 of the mechanical switch 190 without removing the faceplate 196. In this regard, the remote control device 300 may be mounted over an installed mechanical switch, such as the mechanical switch 190, without performing any electrical re-wiring of the mechanical switch.

Figure 30:
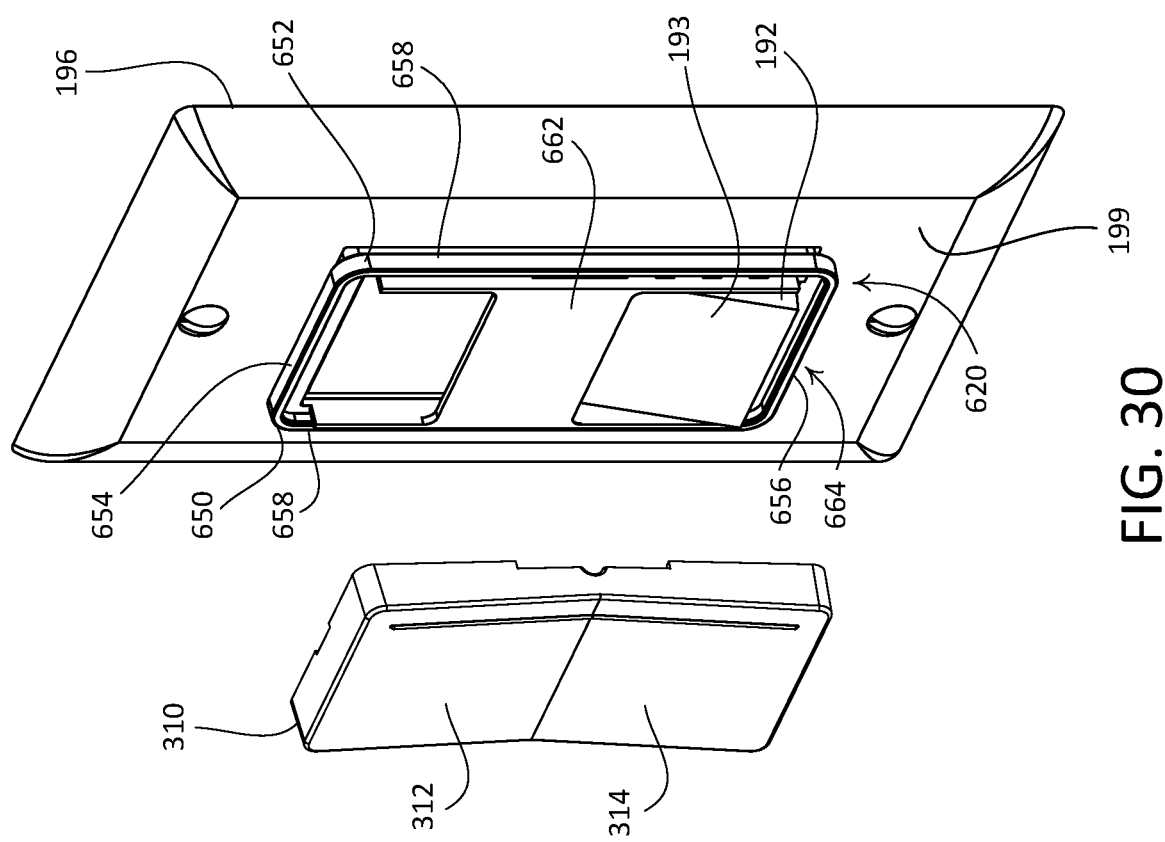
FIG. 30 is a perspective view of the example remote control device illustrated in FIG. 28, with the base of the remote control device attached to a paddle actuator of the light switch and with a control unit component of the remote control device detached from the frame.

The base 620 may include a plurality of mounting teeth 630 and a frame 650, for example, as shown. The frame 650 may be made of any suitable material, such as plastic. The mounting teeth 630 may be configured to secure the frame 650 onto the protruding portion of the paddle actuator 192. Each of the plurality of mounting teeth 630 may be a thin piece of metal that is cantilevered from the frame 650. Each of the plurality of mounting teeth 630 may have a rectangular shape. The mounting teeth 630 may be arranged along opposed sides of an opening 664 that extends through the frame 650. The mounting teeth 630 may be evenly spaced along the opposed sides of the opening 664. The opening 664 may be configured to receive the protruding portion of the paddle actuator 192 therein. When the protruding portion of the paddle actuator 192 is received in the opening 664, the frame 650 may at least partially surround the paddle actuator 192 (e.g., as shown in FIG. 30). The mounting teeth 630 may be configured to be attached to the protruding portion of the paddle actuator 192 of the mechanical switch 190. For example, the mounting teeth 630 may engage opposed walls of the protruding portion of the paddle actuator 192 of the mechanical switch 190. The mounting teeth 630 may be compliant such that the mounting teeth 630 are configured to bend as they engage the opposed walls of the protruding portion of the paddle actuator 192 of the mechanical switch. The mounting teeth 630 may apply a force against (e.g., bite into) the opposed walls of the protruding portion of the paddle actuator 192 of the mechanical switch.

The frame 650 may include an outer wall 652 that extends along a perimeter of the frame 650, for example, as shown. The outer wall 652 may alternatively be referred to as a perimeter wall of the frame 650. The outer wall 652 may include a first end wall 654, an opposed second end wall 656, and opposed side walls 658 that extend from respective ends of the first end wall 654 to corresponding ends of the second end wall 656. In accordance with the illustrated orientation of the frame 650, the first end wall 654 may be referred to as an upper end wall of the frame 650 and the second end wall 656 may be referred to as a lower end wall of the frame 650. The outer wall 652 may define a rear surface 660 of the frame 650. The mounting teeth 630 may be configured to deflect (e.g., bend) near or at the opposed side walls 658.

The frame 650 may be configured such that the outer wall 652 (e.g., at least a portion of the rear surface 660 of the frame 650) abuts the bezel 194 when the base 620 is attached to the protruding portion of the paddle actuator 192, for example, as illustrated. It should be appreciated that the outer wall 652 of the frame 650 is not limited to the illustrated geometry. For example, the frame 650 may be configured such that the outer wall 652 encloses the bezel 194 of the mechanical switch 190 and the rear surface 660 of frame 650 abuts the outer surface 199 of the faceplate 196. In another example, the frame 650 may be configured such that the outer wall 652 encloses the faceplate 196 of the mechanical switch 190, for instance such that the rear surface 660 of frame 650 abuts a surface of a structure in which the mechanical switch 190 is installed, such as a surface of a wall.

The frame 650 may be configured such that one or more outer perimeter surfaces of the outer wall 652 protrude beyond corresponding outer perimeter surfaces of the bezel 194 of the mechanical switch 190, for example, as shown. It should be appreciated that the outer wall 652 of the frame 650 is not limited to the illustrated geometry. For example, the frame 650 may be configured such that the outer perimeter surfaces of the outer wall 652 are flush with, or recessed relative to, corresponding outer perimeter surfaces of the bezel 194 of the mechanical switch 190. Such a configuration may allow the faceplate 196 of the mechanical switch 190 to be removed without detaching the frame 650 from the paddle actuator 192 of the mechanical switch 190.

The frame 650 may further include a cross member 662 that extends between the opposed side walls 658 of the outer wall 652 (e.g., from a first one of the side walls 658 to the other side wall 658). The cross member 662 may be configured to provide structural support to the base 620.

The base 620 may be configured to facilitate alignment of the frame 650 relative to the mechanical switch 190, for instance during attachment of the base 620 to the paddle actuator 192 of the mechanical switch 190. For example, the base 620 may further include one or more alignment members (not shown) that may be configured to be received in the gap 197 between the bezel 194 of the mechanical switch 190 and the opening 198 of the faceplate 196.

In an example process of attaching the base 620 to the paddle actuator 192 of the mechanical switch 190, the frame 650 may be aligned with the bezel 194 of the mechanical switch 190, for example such that alignment features of the frame 650 are received in the gap 197. The mounting teeth 630 may then be secured to the protruding portion of the paddle actuator 192 (e.g., the second actuation surface 193 when the paddle actuator 192 is in the first position as shown) by applying a force on the base 620 in the direction of the mechanical switch 190. As the mounting teeth 630 are secured to the protruding portion of the paddle actuator 192, the rear surface 660 of the frame 650 may be biased against the bezel 194 of the mechanical switch 190. With the base 620 attached to the paddle actuator 192 (e.g., as shown in FIG. 30), the control unit 310 may be attached to the base 620.

Figure 32:
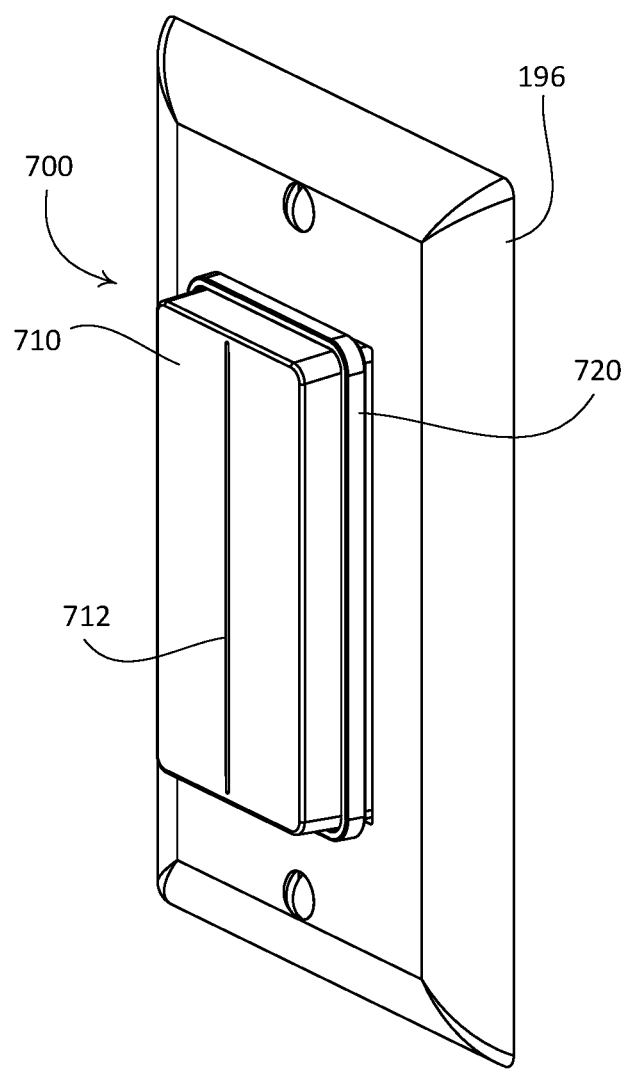
FIG. 32 is a perspective view of another example remote control device having an alternate control unit component.

FIG. 32 depicts an example remote control device 700 (e.g., such as the remote control devices 100, 200, and/or 300) having an alternate control unit 710. The example remote control device 700 may include a control unit 710 and a base 720 that may operate as a mount for the control unit 710, for example, as shown. The base 720 may alternatively be referred to as a base portion or a mounting assembly. The control unit 710 and the base 720 may be configured such that the control unit 710 may be removably attached to the base 720. The base 120 may be attached to a paddle actuator (e.g., such as paddle actuator 192 shown in FIG. 2A) of a mechanical switch (e.g., the mechanical switch 190 shown in FIG. 2A) without removing the faceplate 196. In this regard, the remote control device 700 may be mounted over an installed mechanical switch, such as the mechanical switch 190, without performing any electrical re-wiring of the mechanical switch, as described herein.

The control unit 710 may define a control interface that is configured to receive inputs, such as finger presses and/or gestures, from a user of the remote control device 700. For example, in accordance with the illustrated configuration, the control unit 710 may define a capacitive touch surface 712 that may be configured to detect touches along an x axis, a y axis (e.g., as shown in FIG. 32), or both an x and y axis.

It should be appreciated that the bases 120, 220, 320, 420, 520, and 620 are not limited to the respective configurations illustrated and described herein, and that respective components of the bases may alternatively be configured with other suitable geometries. For example, the respective frames 150, 250, 350, 450, 550, and 650 of the bases 120, 220, 320, 420, 520, and 620, may be alternatively configured such that their outer walls bound greater or lesser areas. To illustrate, the outer walls of one or more of the frames 150, 250, 350, 450, 550, and 650 may be configured to bound an area that is smaller than the footprint of the paddle actuator 192 of the mechanical switch 190, which may allow the faceplate 196 to be removed without disturbing the frame or necessitating its detachment from the paddle actuator 192. Additionally, it should be appreciated that the respective mounting tabs of the bases 120, 220, 320, 420, 520, and 620 are not limited to the respective configurations illustrated and described herein, and may alternatively be configured with other suitable geometries, for instance to define alternative attachment surfaces.

It should further be appreciated that one or more of the frames 150, 250, 350, 450, 550, and 650 may be alternatively configured to allow releasable attachment of control units having geometries different from those of the illustrated control units. To illustrate, one or more of the frames 150, 250, 350, 450, 550, and 650 may be alternatively configured to allow releasable attachment of control units having respective footprints (e.g., areas) that are larger than the corresponding footprints of the frames, for instance such that the control units enclose the frames and/or at least partially hide the frames from view. Additionally, one or more of the frames 150, 250, 350, 450, 550, and 650 may be alternatively configured to allow releasable attachment of control units other than the illustrated control units 110, 210, 310, and 710 such as control units having different geometries and/or defining other types of user interfaces, for example.

It should further still be appreciated that configuring the base of a remote control device such that the frame of the base biases against the bezel of a mechanical switch to which the base is mounted (e.g., in accordance with the bases 220, 320, 420, 520, and 620 illustrated and described herein) may provide one or more advantages. For example, so configuring the base may limit or reduce the need to account for variables in one or more of the lateral (e.g., side-to-side), longitudinal (e.g., upward and downward), and transverse (e.g., along a direction perpendicular to the outer surface of the faceplate) that may be exhibited by the respective dimensions or geometries (e.g., paddle heights) of different mechanical switches and/or installation conditions of the mechanical switches. Additionally, so referencing the base to the bezel of the mechanical switch, for instance rather than to the outer surface of the faceplate, may eliminate the need to account for the frame enclosing the bezel of the mechanical switch, since bezel dimensions may vary from switch to switch.

It should further still be appreciated that any of the example remote control devices 100, 200, 300, and 700 illustrated and described herein may provide a simple retrofit solution for an existing switched control system, and may ease the installation of a load control system or enhance an existing load control system installation. A load control system that integrates one of the remote control devices 100, 200, 300, or 700 may provide energy savings and/or advanced control features, for example without requiring any electrical re-wiring and/or without requiring the replacement of any existing mechanical switches.

It should further still be appreciated that load control systems into which the example remote control devices 100, 200, 300, and/or 700 may be integrated are not limited to the example load control devices and/or electrical loads described above. For example, load control systems into which the remote control devices 100, 200, 300, and/or 700 may be integrated may include one or more of: a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a setpoint temperature of a heating, ventilation, and air-conditioning (HVAC) system; an air conditioner; a compressor; an electric baseboard heater controller; a controllable damper; a variable air volume controller; a fresh air intake controller; a ventilation controller; hydraulic valves for use in one or more radiators of a radiant heating system; a humidity control unit; a humidifier; a dehumidifier; a water heater; a boiler controller; a pool pump; a refrigerator; a freezer; a television and/or computer monitor; a video camera; an audio system or amplifier; an elevator; a power supply; a generator; an electric charger, such as an electric vehicle charger; an alternative energy controller; and the like.

What is claimed is:

1. A base configured to be attached to a paddle actuator of an installed mechanical switch that controls whether power is delivered to an electrical load, the base comprising:
   a frame that defines an opening that is configured to receive a protruding portion of the paddle actuator, the protruding portion of the paddle actuator projecting outward when the mechanical switch is operated into a position that causes the power to be delivered to the electrical load, wherein, when the protruding portion of the paddle actuator is received in the opening, the frame at least partially surrounds the paddle actuator, and wherein the frame comprises:
   an outer wall that extends along a perimeter of the frame;
   a cross member that extends between opposed side walls of the outer wall; and
   a plurality of mounting teeth that extend from the opposed side walls into the opening, the plurality of mounting teeth configured to be attached to the protruding portion of the paddle actuator,
   wherein the plurality of mounting teeth is configured to, when the base is attached to the paddle actuator, engage opposed walls of the protruding portion of the paddle actuator such that a rear surface of the frame is biased against a structure that surrounds the paddle actuator.

2. The base of claim 1, wherein the plurality of mounting teeth is configured to secure the frame to the paddle actuator.

3. The base of claim 1, wherein each of the plurality of mounting teeth comprises a thin piece of metal that is cantilevered from the frame.

4. The base of claim 1, wherein each of the plurality of mounting teeth has a rectangular shape.

5. The base of claim 1, wherein the plurality of mounting teeth is evenly spaced along opposed sides of the opening.

6. The base of claim 1, wherein each of the plurality of mounting teeth is compliant such that each of the plurality of mounting teeth bends as they engage the paddle actuator.

7. The base of claim 6, wherein the plurality of mounting teeth bites into the opposed walls of the protruding portion of the paddle actuator.

8. A remote control device for use in a load control system, the remote control device configured to be mounted over an installed mechanical switch that controls whether power is delivered to an electrical load, the remote control device comprising:
- a frame that defines an opening that is configured to receive a protruding portion of a paddle actuator, the protruding portion of the paddle actuator projecting outward when the mechanical switch is operated into a position that causes the power to be delivered to the electrical load, wherein, when the protruding portion of the paddle actuator is received in the opening, the frame at least partially surrounds the paddle actuator, and wherein the frame comprises:
  - an outer wall that extends along a perimeter of the frame;
  - a cross member that extends between opposed side walls of the outer wall; and
  - a plurality of mounting teeth that extend from the opposed side walls into the opening, the plurality of mounting teeth configured to be attached to the protruding portion of the paddle actuator,
- a control unit that is configured to be attached to the frame, the control unit including a control interface and a wireless communication circuit, the control unit configured to translate a user input from the control interface into a control signal that controls a load control device, the control unit further configured to cause the wireless communication circuit to transmit the control signal,
- wherein the plurality of mounting teeth is configured to, when the remote control device is mounted over the mechanical switch, engage opposed walls of the protruding portion of the paddle actuator such that a rear surface of the frame is biased against a structure that surrounds the paddle actuator.

9. The remote control device of claim 8, wherein the plurality of mounting teeth is configured to secure the frame to the paddle actuator.

10. The remote control device of claim 8, wherein each of the plurality of mounting teeth comprises a thin piece of metal that is cantilevered from the frame.

11. The remote control device of claim 8, wherein each of the plurality of mounting teeth has a rectangular shape.

12. The remote control device of claim 8, wherein the plurality of mounting teeth is evenly spaced along opposed sides of the opening.

13. The remote control device of claim 8, wherein each of the plurality of mounting teeth is compliant such that each of the plurality of mounting teeth bends as they engage the paddle actuator.

14. The remote control device of claim 13, wherein the plurality of mounting teeth bites into the opposed walls of the protruding portion of the paddle actuator.

* * * * *